US010796217B2

(12) United States Patent
Wu

(10) Patent No.: US 10,796,217 B2
(45) Date of Patent: Oct. 6, 2020

(54) SYSTEMS AND METHODS FOR PERFORMING AUTOMATED INTERVIEWS

(71) Applicant: Microsoft Technology Licensing, LLC, Redmond, WA (US)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 755 days.

(21) Appl. No.: 15/364,721

(22) Filed: Nov. 30, 2016

(65) Prior Publication Data

US 2018/0150739 A1    May 31, 2018

(51) Int. Cl.
| | |
|---|---|
| *G06N 3/00* | (2006.01) |
| *G06N 20/00* | (2019.01) |
| *G06Q 10/10* | (2012.01) |
| *G06F 40/211* | (2020.01) |
| *G10L 15/22* | (2006.01) |
| *G10L 25/63* | (2013.01) |

(52) U.S. Cl.
CPC .......... *G06N 3/006* (2013.01); *G06F 40/211* (2020.01); *G06N 20/00* (2019.01); *G06Q 10/1053* (2013.01); *G10L 15/22* (2013.01); *G10L 25/63* (2013.01)

(58) Field of Classification Search
CPC ........ G06N 20/00; G06N 20/10; G06N 20/20; G06N 3/006; G06Q 10/1053; G10L 25/63; G10L 15/22; G06F 40/211
USPC .......................................................... 706/11
See application file for complete search history.

(56) References Cited

U.S. PATENT DOCUMENTS

| | | |
|---|---|---|
| 6,701,322 B1 | 3/2004 | Green |
| 8,112,365 B2 | 2/2012 | Foster |
| 8,843,388 B1 | 9/2014 | Wesffall et al. |
| 2003/0037032 A1 | 2/2003 | Neece et al. |
| 2005/0114279 A1 | 5/2005 | Scarborough et al. |
| 2008/0172284 A1 | 7/2008 | Hartmann |
| 2012/0271774 A1 | 10/2012 | Clegg |
| 2013/0332381 A1 | 12/2013 | Clark et al. |

(Continued)

FOREIGN PATENT DOCUMENTS

| | | | |
|---|---|---|---|
| IN | 03717DE2014 A | 6/2016 | |
| WO | WO -2015027079 A1 * | 2/2015 | ........... A61B 5/0205 |
| WO | 2015198317 A1 | 12/2015 | |

OTHER PUBLICATIONS

Homma, Yushi. Detecting Duplicate Questions with Deep Learning (2016), 30th Conference on Neural Information Processing Systems (Year: 2016).*

(Continued)

*Primary Examiner* — Shane D Woolwine

(57) ABSTRACT

Systems and methods for automatically interviewing a technical candidate are provided. The systems and method determine emotional states of the candidate and relevance scores for one or more provided answers from the candidates. The systems and methods utilized the emotional states and relevance scores to determine the next type of question and the appropriate difficulty level for the next question to ask the candidate during an automated interview. Additionally, systems and method may generate technical question-answer pairs for the interview utilizing a search of world knowledge.

20 Claims, 24 Drawing Sheets

(7 of 24 Drawing Sheet(s) Filed in Color)

(56) References Cited

U.S. PATENT DOCUMENTS

| | | | |
|---|---|---|---|
| 2014/0112556 A1* | 4/2014 | Kalinli-Akbacak | G10L 25/63 382/128 |
| 2014/0236850 A1 | 8/2014 | Holland | |
| 2014/0289145 A1* | 9/2014 | Coleman | G06Q 10/1053 705/321 |
| 2015/0142685 A1* | 5/2015 | Willis | G06Q 10/1053 705/321 |
| 2016/0034839 A1* | 2/2016 | Aggarwal | G06Q 10/06398 705/7.42 |
| 2016/0103754 A1* | 4/2016 | Aggarwal | G06F 11/3608 717/126 |
| 2016/0117314 A1* | 4/2016 | Kantor | G06F 40/56 704/9 |
| 2016/0350311 A1* | 12/2016 | Reeves | G06F 3/04842 |
| 2016/0350801 A1* | 12/2016 | Vincent | G06Q 30/0251 |
| 2017/0344532 A1* | 11/2017 | Zhou | G06F 40/35 |

OTHER PUBLICATIONS

"Talkpush : Meet Stanley", htttps://www.talkpush.com/chatbot.html, Retrieved on: Oct. 26, 2016, 4 pages.

Dudler, Luc, "Chatbot News Daily", https://chatbotnewsdaily.com/machine-intelligence-will-supercharge-recruiting-2fd340bec612, Published on: Jul. 20, 2014, 9 pages.

"The Penn Treebank Project", https://www.cis.upenn.edu/~treebank/, Published on: Feb. 2, 1999, 2 pages.

Nivre, Joakim, "Algorithms for Deterministic Incremental Dependency Parsing", In Journal of Association for Computational Linguistics, vol. 34, No. 4, Nov. 3, 2007, pp. 513-533.

"Stanford Dependencies", http://nlp.stanford.edu/software/stanford-dependencies.shtml, Retrieved on: Nov. 2, 2016, 4 pages.

"Stack Overflow", http://stackoverflow.com/, Retrieved on: Nov. 2, 2016, 6 pages.

Silveira, et al., "A Gold Standard Dependency Corpus for English", In Proceedings of the Ninth International Conference on Language Resources and Evaluation, May 26, 2014, 8 pages.

Yamada, et al., "Statistical dependency analysis with support vector machines", In Proceedings of the 8th International Workshop on Parsing Technologies, vol. 3, Apr. 23, 2003, 12 pages.

Mikolov, et al., "Distributed Representations of Words and Phrases and their Compositionality", In Proceedings of 27th Annual Conference on Neural Information Processing Systems, Dec. 5, 2013, pp. 1-9.

Huang, et al., "Learning deep structured semantic models for web search using clickthrough data", In Proceedings of ACM International Conference on Information and Knowledge Management, Oct. 27, 2013, pp 2333-2338.

Cho, et al., "Learning Phrase Representations using RNN Encoder—Decoder for Statistical Machine Translation", In Proceedings of the Conference on Empirical Methods in Natural Language Processing, Oct. 25, 2014, 15 pages.

"International Search Report and Written Opinion Issued in PCT Application No. PCT/US2017/063176", dated Jan. 30, 2018, 11 Pages.

\* cited by examiner

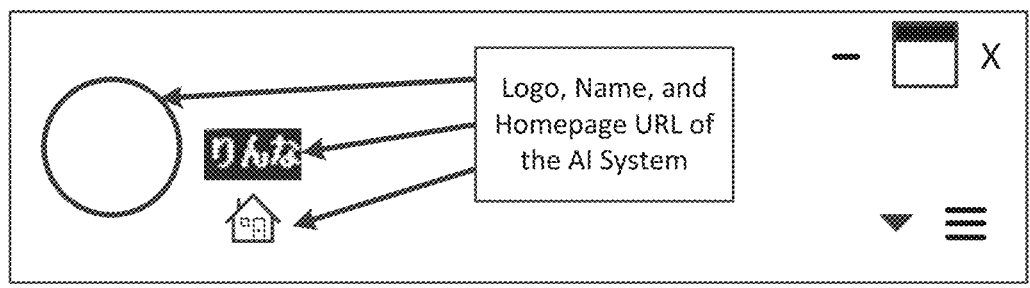

AI Question Text

Hi, the first question is: how to detect a loop in a linked list?

I would like to start from a simple solution. I will visit each node of the list, recording its identity, it's memory address for example, into another list...

Candidate's Answer Text

Nice! That is quite a good answer.

How can you find a cycle with a limited memory constraint?

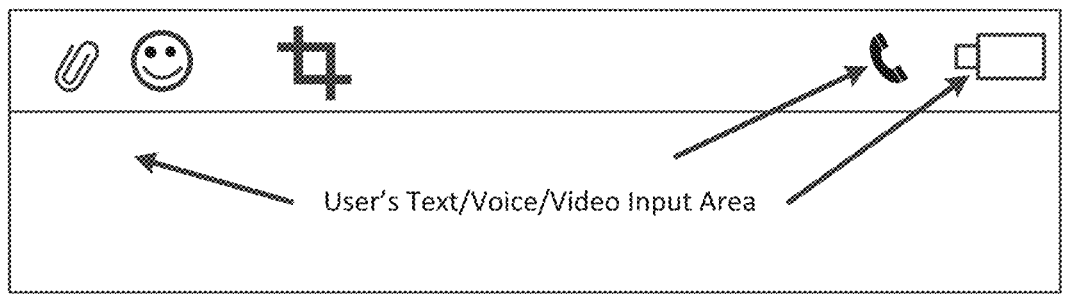

User's Text/Voice/Video Input Area

FIG. 3

Question: How to detect a loop in a linked list?

Answer: You can make use of Floyd's cycle-finding algorithm, also known as *tortoise and hare algorithm*.
The idea is to have two references to the list and move them at different speeds. Move one forward by 1 node and the other by 2 nodes ·If the linked list has a loop they will *definitely* meet.
·Else either of the two references (or their next will become null
Java function implementing the algorithm:

Boolean hasLoop(Node first) {

*Text answer: comment*

```
If (first == null)// list does not exist..so no loop either.
    return false;
Node slow, fast;  // create two references.
slow = fast = first;  // make both refer to the start of th
while (true) {
    slow = slow.next;            // 1 hop.
    if(fast.next != null)
        fast = fast.next.next; // 2 hops.
    else
        return false;            // next node null => no loop.
    if (slow == null || fast == null) // if either hits null.. No loop.
        return false;
    if (slow == fast) // if the two ever meet...we must have a loop.
        return false;
}
}
```

*Code answer*

FIG. 9A

Question: How to detect a loop in a linked list?

Answer: The idea is to use a hast to store the identity of nodes accessed, and when a node already exists in the hash, than a loop is found.

Text answer: comment

```
public static boolean hasCycle (LinkedList<Node> list)
{
        HashSet<Node> visited = new HashSet<Node>( );
        for (Node n : list)
        {
                visited.add(n);
                if (visited.contains (n.next))
                {
                return true;
                }
        }
        return false;
```

Code answer

SYSTEMS AND METHODS FOR PERFORMING AUTOMATED INTERVIEWS

BACKGROUND

Bots are becoming more and more prevalent and are being utilized for more and more different tasks. As understood by those skilled in the art, bots are software applications that may run automated tasks over a network, such as the Internet. Chat bots are designed to conduct a conversation with a user via text, auditory, and/or visual methods to simulate human conversation. A chat bot may utilize sophisticated natural language processing systems or scan for keywords from a user input and then pull a reply with the most matching keywords or the most similar wording pattern from a database. However, chat bots are often limited to simple task driven conversations.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for automatically interviewing a technical candidate. More specifically, the systems and methods disclosed herein may prepare and update technical question-answer pairs by searching world knowledge. Further, the system and methods as disclosed herein are capable of evaluating a received candidate answer to determine an emotional state of the candidate for the answer and to determine a relevance score for the answer. The system and methods as disclosed herein are capable of determining whether the next automated reply should be in the chat domain or the technical question domain based on the determined emotional state and/or a relevance score for the answer. Additionally, the systems and methods as disclosed herein are capable of changing the level of difficulty provided in the next technical question based on a relevance score and/or the emotional state. Further, systems and methods as disclosed herein are capable of analyzing each candidate's interview as a whole and providing a summary recommendation for the candidate and/or a comparison of the summary recommendation for the candidate to other candidates that have been previously interviewed.

One aspect of the disclosure is directed to a system for automated interviewing of software engineers. The system includes at least one processor and a memory. The memory encodes computer executable instruction that, when executed by the at least one processor, are operative to:
  receive a first answer to a first question given to a candidate, wherein the first question is a first technical question;
  analyze the first answer to determine a time and space complexity of the first answer;
  compare the time and space complexity of the first answer to a time and space complexity of a reference answer for the first question;
  determine a relevance score of the first answer based on the comparison of the time and space complexity of the first answer to the time and space complexity of the reference answer;
  analyze candidate signals during the first answer to determine an emotional state of the candidate during the first answer, wherein the candidate signals are at least voice input and text input;
  determine a difficulty level for a next technical question based on at least one of the relevance score and the emotional state;
  determine whether a first reply to the candidate should be in a chat domain or in a technical domain based on at least one of the relevance score and the emotional state to form a domain determination;
  select the first reply from a collection of chat replies or from a collection of technical question-answer pairs based on the domain determination; and
  provide the first reply to the candidate in response to the first answer.

The next technical question is provided to the candidate is selected from the collection of technical question-answer pairs based on the difficulty level. The next chat reply is provided to the candidate is selected from the collection of chat replies.

In yet another aspect of the invention, the disclosure is directed to a system for automated interviewing of software engineers. The system includes at least one processor and a memory. The memory encodes computer executable instruction that, when executed by the at least one processor, are operative to:
  prepare a collection of chat replies from world knowledge and from received predetermined chat question-answer pairs;
  prepare a collection of technical question-answer pairs from the world knowledge, wherein the world knowledge includes textbooks, articles, and coding websites;
  select questions from the collection of technical question-answer pairs and the collection of chat replies based on relevance scores of candidate provided answers and emotional states of candidates during the candidate provided answers;
  assign the relevance scores to user provided answers, utilizing a recurrent neural network that determines time and space complexities of the candidate provided answers and compares the time and space complexities of the candidate provided answers with time and space complexities of corresponding reference answers;
  determine emotional states for each candidate provided answers by evaluating text input from the candidate provided answers; and
  evaluate communication skills, interpersonal skills, technical competency, and team collaboration of every candidate to determine a recommendation score for each of the communication skills, the interpersonal skills, the technical competency, and the team collaboration for the candidates.

The collection of technical question-answer pairs from the world knowledge is prepared by parsing sentences from the world knowledge with a trained sentence parser utilizing a syntactic dependency tree to form parsed sentences, extracting a knowledge graph from the parsed sentences utilizing a heuristic algorithm, and generating the technical question-answer pairs from the knowledge graph.

In another aspect, a method for interviewing software engineers is disclosed. The method includes:
  receiving a first answer to a first question given to a candidate, wherein the first question is a first technical question;
  analyzing the first answer to determine a time and space complexity of the first answer;

comparing the time and space complexity of the first answer to a time and space complexity of a reference answer for the first question;

determining a normal relevance score of the first answer based on the comparison of the time and space complexity of the first answer to the time and space complexity of the reference answer;

analyzing at least one of voice input and text input for the first answer by the candidate to determine that the candidate is in a negative emotional state;

determining that a difficulty level for a second technical question should be less than a difficulty level for the first technical question based on the normal relevance score and the negative emotional state;

determining that a first reply to the candidate should be in a chat domain based on the negative emotional state of the candidate;

in response to determining that the first reply should be in the chat domain, selecting the first reply from a collection of chat replies based on the negative emotional state;

providing the first reply to the candidate in response to the first answer;

receiving a second answer from the candidate in response to the first reply;

analyzing at least one of voice input and text input for the second answer to determine that the candidate is in a positive emotional state;

determining that a second reply to the candidate should be in a technical domain based on the positive emotional state of the candidate;

in response to determining that the second reply should be in the technical domain, selecting the second technical question with the difficulty level that is less than the difficulty level of the first technical question from a collection of technical question-answer pairs; and providing the second technical question to the candidate in response to the second answer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures. The patent or application file contains at least one drawing executed in color. Copies of this patent or patent application publication with color drawings(s) will be provided by the Office upon request and payment of the necessary fee.

FIG. 3 is schematic diagram illustrating a screen shot of a user interface of the candidate's client computing device during an interview with an artificial intelligence interview chat bot system, in accordance with aspects of the disclosure.

FIGS. 9A and 9B are schematic diagrams each illustrating an example of a technical question along with a corresponding reference answer for the technical question written in natural language and in code, in accordance with aspects of the disclosure.

DETAILED DESCRIPTION

Figure 1A:
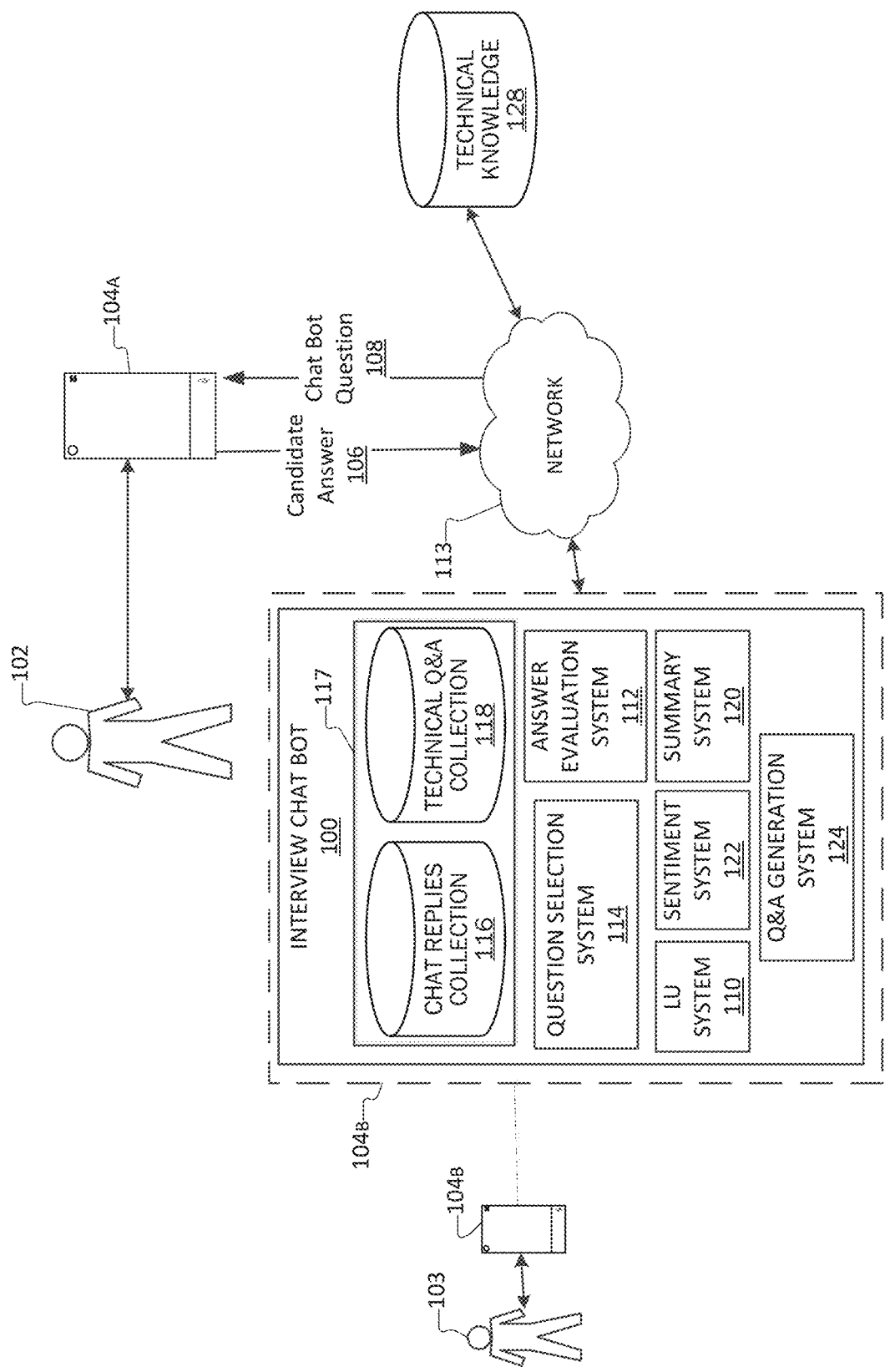
FIG. 1A is a schematic diagram illustrating an interview chat bot on an interviewer's client computing device for performing an automated interview of a technical candidate being utilized by the technical candidate via a first client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Bots are becoming more and more prevalent and are being utilized for more and more different tasks. As understood by those skilled in the art, bots are software applications that may run automated tasks over a network, such as the Internet. Chat bots are designed to conduct a conversation with a user via auditory or visual methods to simulate human conversation. A chat bot may utilize sophisticated natural language processing systems or scan for keywords from a user input and then pull a reply with the most matching keywords or the most similar wording pattern from a database. Chat bots are often utilized for customer service or information acquisition. However, chat bots are often limited to simple task driven conversations.

Interviewing candidates is an essential part of recruiting new employees to the company. Four main goals of the interview include:

Conduct an effective interview;
Create an impressive experience for the candidates;
Sell the candidate on why the company is a great place to work; and
Determine a hiring recommendation;

Typically, through the interview process, the company wants to achieve the following goals:

Hiring the best candidates with beyond average quality in several different skills, such as communication skills, technical competency, team collaboration, interpersonal skills, etc.;
Pick candidate that are a good fit for the company and the company's current team member; and
Provide team diversity by ensuring there are no hidden biases relating gender, age, color, nationality, and so on during the interviewing process.

Interviews are, typically, held by an employee of the company, such as a human resource director. However, the interviewer will most likely have to be paid, have sufficient technical expertise to ask appropriate questions, prepare technical questions for the interview, have his or her own biases, and/or may be affected by different emotional stimuli on different days.

The systems and method as disclosed herein are directed to an artificial intelligence (AI) interview chat bot for interviewing a candidate for different technical fields, such as computer engineering, computer programming, and computer science. This list is not limiting and the chat bot may be designed to conduct interview any desired technical field. The systems and methods as disclosed herein are capable of preparing and updating technical question-answer pairs by searching world knowledge. Further, the interview chat bot is capable of evaluating a received candidate answer to determine a relevance score and an emotional state for the answer. The interview chat bot may utilize the determined relevance score and/or emotion state to determine whether the next provided response from the chat bot should be in the chat domain or the technical question domain. As used herein a question is in the chat domain when the question is selected from the collection of chat replies. The collection of chat replies includes question and answer pairs that relate to nontechnical subject matter, such name, address, weather, hobbies, likes, and/or dislikes. As used herein questions are in the technical domain when the question is selected from the collection of technical questions-answer pairs. The technical question answer-pairs are related to industry specific questions and answers that related to the technical field of the job opening. Additionally, the chat bot is capable of changing the level of difficulty provided in the next technical question based on a relevance score and/or the emotional state for one or more previous answers. Further, the chat bot is able to analyze the interview of a candidate as a whole and provide a summary recommendation for the candidate and/or a comparison of the summary recommendation for the candidate to other candidates that have been previously interviewed by the chat bot.

The ability of the systems and methods to perform an automated interview of a technical candidate as described herein provides an interview chat bot that is capable of providing an inexpensive, effective, enjoyable and unbiased interview along with a summary evaluation and/or comparison of the interviewed candidates. Further, the ability of the systems and methods described herein to prepare technical question and answer pairs from the world knowledge prevents the interviewer from having to determine a set of technical questions for the interview. Additionally, the ability of the systems and methods described herein to adjust the difficulty level of the technical questions while monitoring for emotional state allows the chat bot to determine the limit of the candidates' technical skill while still providing a positive experience for the candidates during the interview.

Figure 1B:
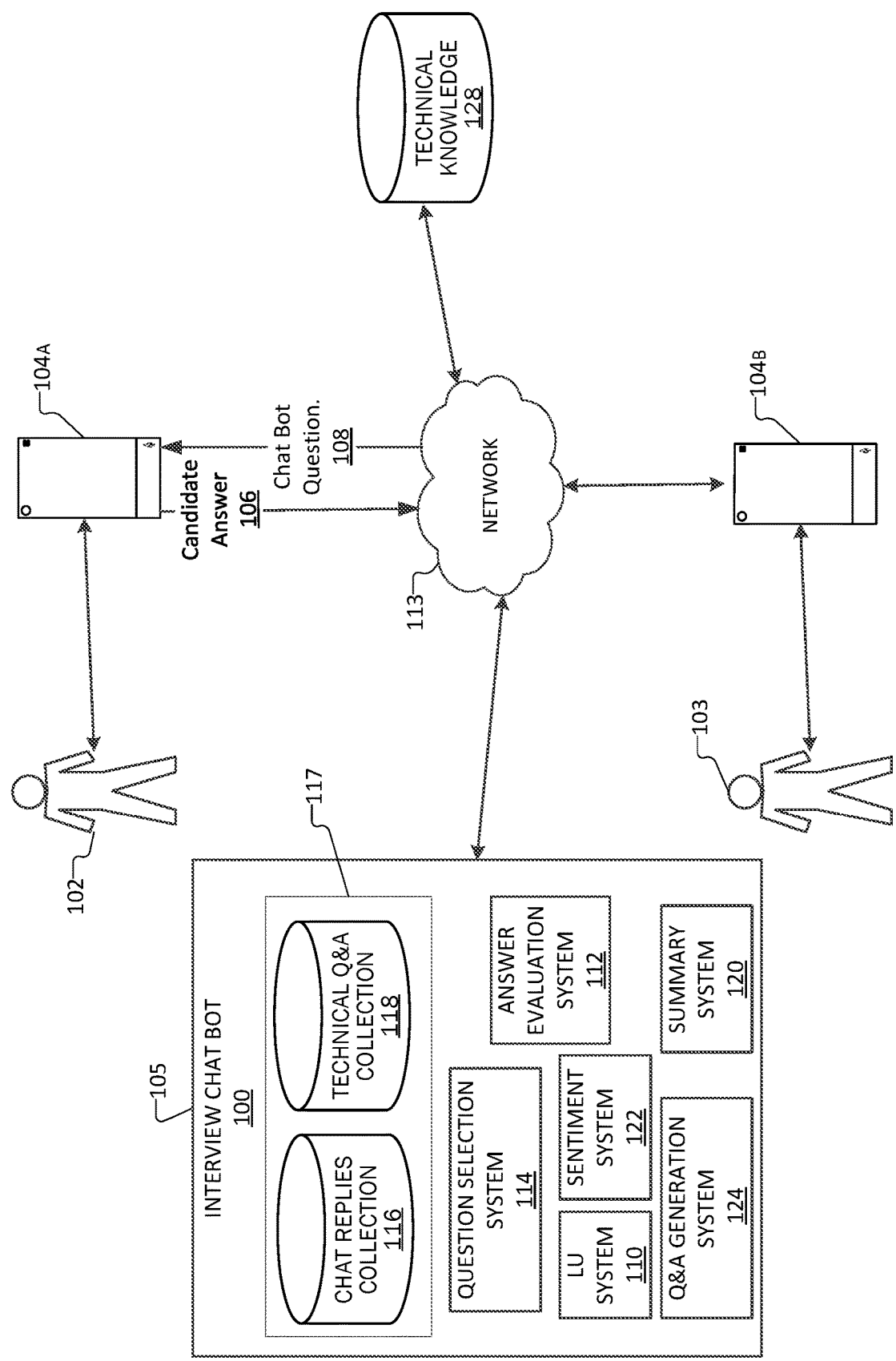
FIG. 1B is a schematic diagram illustrating an interview chat bot for performing an automated interview of a technical candidate being utilized by the technical candidate via a first client computing device and accessed by an interviewer via a second client computing device, in accordance with aspects of the disclosure.

FIGS. 1A and 1B illustrate different examples of an interview chat bot or artificial intelligence (AI) interview chat bot 100 on a client computing device 104B of an interviewer 103 for performing an automated interview of a technical candidate 102 (also referred to as a user 102 herein) being utilized by the candidate 102 via a client computing device 104A, in accordance with aspects of the disclosure. The chat bot 100 is capable of evaluating a candidate's answers for relevance and determining an emotional state of the user during the answer. The chat bot 100 is also capable of selecting the next question based on the candidate's relevance score and/or emotional state for the last answer. Additionally, the chat bot 100 is capable of adjusting the level of difficulty of the next technical questions based on the candidate's relevance score and/or emotional state. The chat bot 100 may further be capable of preparing and updating technical question-answer pairs utilizing world knowledge.

The chat bot 100 includes a language understanding (LU) system 110, an answer evaluation system 112, a question selection system 114, a question-answer index 117, and a summary system 120. The question-answer index 117 includes a collection of chat replies 116 and a collection of technical question-answer pairs 118. In some aspects, the chat bot 100 also includes a sentiment system 122 and/or a question and answer generation system 124. The chat bot 100 communicates with the candidate 102 and accesses world knowledge 128, such as technical knowledge, via a network 113. In some aspects, the network 113 is a distributed computing network, such as the internet.

In some aspects, the chat bot 100 is implemented on the client computing device 104B as illustrated by FIG. 1A. In a basic configuration, the client computing device 104 is a computer having both input elements and output elements. The client computing device 104 may be any suitable computing device for implementing the chat bot 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the chat bot 100 and/or for communicating with the chat bot 100 may be utilized.

In other aspects, the chat bot 100 is implemented on a server computing device 105, as illustrated in FIG. 1B. The server computing device 105 may provide data to and/or receive data from the client computing devices 104A or 104B through the network 113. In further aspects, that chat bot 100 is implemented on more than one server computing device 105, such as a plurality or network of server computing devices 105. For example, the question-answer index 117 may be located on server or database separate from a server containing the summary system 120. In some aspects, the chat bot 100 is a hybrid system with portions of the chat bot 100 on the client computing device 104 and with portions of the chat bot 100 on one or more server computing devices 105.

Figure 2:
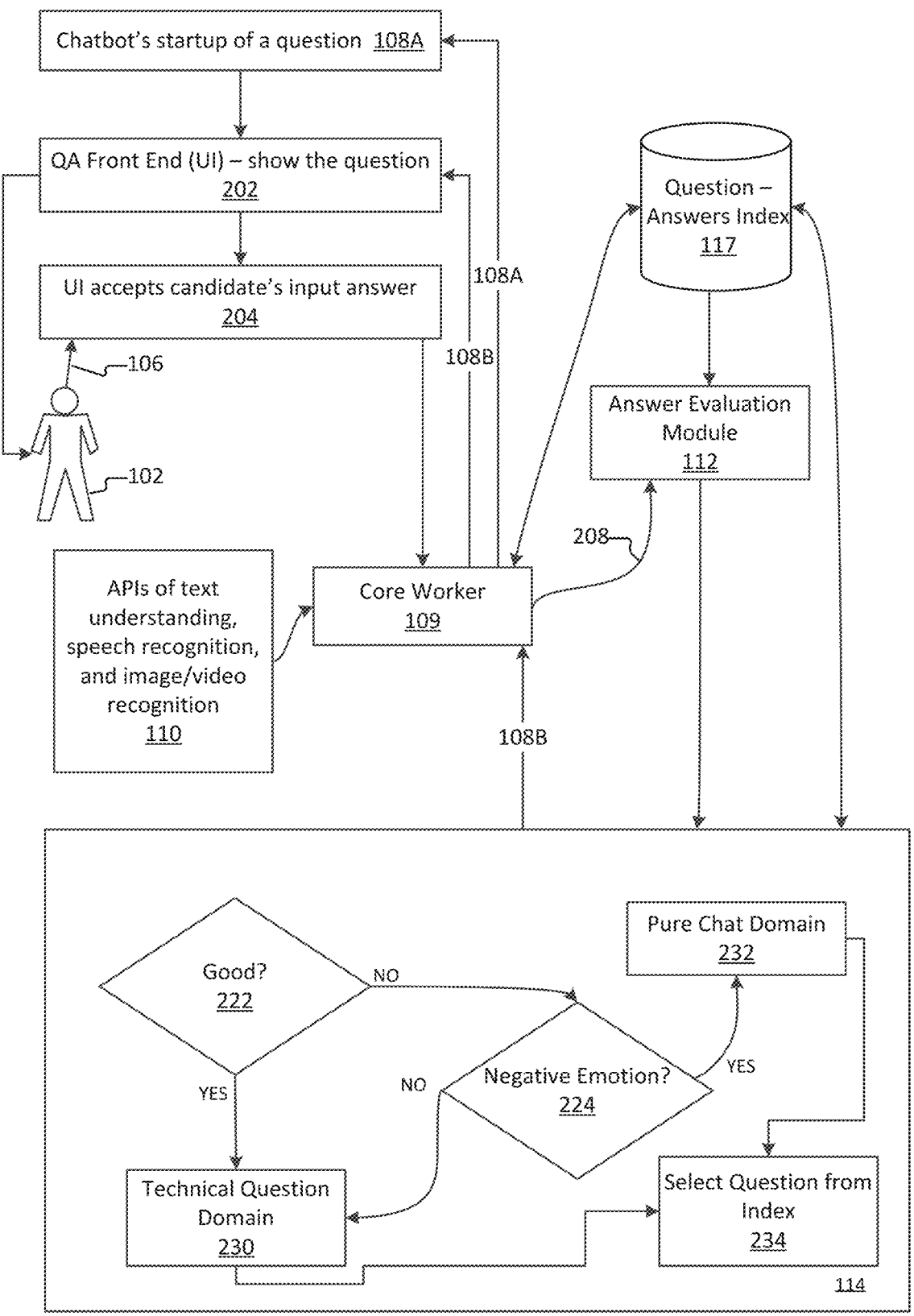
FIG. 2 is a schematic diagram illustrating a flow diagram showing use of an artificial intelligence interview chat bot system by a candidate during an interview, in accordance with aspects of the disclosure.

FIG. 2 illustrates a flow diagram 200 showing an automated interview of a candidate 102 utilizing an AI interview chat bot 100. In order to start the interview, the chat bot 100 provides a predetermined startup reply 108A to the candidate 102. The predetermined startup reply 108A or the selected question 108B is provided to the user via a client computing device 104 at operation 202. After the startup of the interview, the chat bot provides a chat comment and/or question 108B as selected by the question selection system 114. The client computing device 104 provides any response 108 from the chat bot 100 utilizing any known visual, audio, tactile, and/or other sensory mechanisms. In this example, the user interface of the client computing device 104 displays the startup predetermined reply 108A and the question 108B from the chat bot 100 as text. The user 102 inputs his or her answer 106 to the predetermined startup reply 108A and/or the question 108B into the user interface at operation 204. The user or candidate 102 may provide his answer as text, video, audio, and/or any other known method for gathering user input. In the user's input area, a candidate can type text, select emoji symbols, and make a short-cut of current screen. Additionally, the candidate can make a voice call or a video conversation with the chat bot 100. In this example, the user interface of the client computing device 104 received the user's answer 106 as video input.

The chat bot 100 collects the user's answer 106 from the client computing device 104. The term "collect" as utilized herein refers to the passive receiving or receipt of data and/or to the active gathering or retrieval of data. The core worker 109 of the chat bot 100 collects the user's answers 106.

For example, in the user interface (UI) as shown in FIG. 3, the chat bot 100 provides a question "Hi, the first question is: how to detect a loop in a linked list?" to the candidate. In FIG. 3, Rinna stands for the name of the AI chat bot system. The above sentence is transferred to the "request queue", which stores users' requests in multimedia format including texts, sounds, images, and even videos by the core worker 109 of the chat bot. However, the chat bot 100 deals with different kinds of multimedia inputs differently. For example, for real-time sounds and videos, the AI chat both 100 needs a sufficient amount of core workers 109 to ensure that the queue is not too long so any candidates utilizing the chat bot do not receive too long of a delay between his or her answer and the AI chat bot reply. For texts and images, the AI chat bot 100 may utilize less core workers 109 for processing.

The core worker 109 collects the request queue as input. Requests in the queue are served and/or responded to in first-in-first-out manner by the core worker 109. As such, the core worker 109 will one-by-one determine a type of input (voice, video, text, etc.) and domain (chat or technical) of each answer for proper processing by the chat bot 100. For example, the core worker 109 will send answers in the technical domain after processing to the answer evaluation system 112. Alternatively, for example, the core worker 109 will send answers in the chat domain after processing to the question selection system 114.

The core worker 109 utilizes or sends the user's answers to a language understanding (LU) system 110 for processing. The LU system 110 converts the user's answers 106 into text and/or annotated text. The LU system 110 includes application programming interfaces (APIs) for text understanding, speech recognition, and/or image/video recognition for processing user answers 106 into text and/or annotated text form.

Sounds need to be recognized and decoded as texts. A speech recognition API may be necessary for the speech-to-text conversion task and is part of the LU system 110. Furthermore, the LU system 110 may need to convert a generated response from text to voice to provide a voice response to the candidate. Further, the LU system 110 may also include an image recognition API to "read" and "understand" received images from the candidate 102. The image recognition API of the LU system 110 translates or decodes received images into text. Further, a question by the chat bot may be translated into images by the LU system 110 to provide an image response to the user. For example, when a candidate gets a technical question correct, the chat comment could be a thumbs-up, which is displayed to the candidate as an image or emoticon.

The core worker framework allows APIs to be easily added or removed. As such, the core worker framework is extensible. For example, a Java compiler can be plugged in to the core worker 109 to test the correctness of candidate's technical answer, such as code answers for computer engineers.

The responses generated by the chat bot 100 are provided to the core worker 109. The core worker 109 transfers the response to the response queue or into a cache. The cache is necessary to make sure that a sequence of AI chat bot responses or replies can be shown to the candidate in a pre-defined time stream. That is, for one user's request, if there are no less than two responses generated by the core worker 109, then a time-delay setting for the responses may be necessary.

For example, if the user says, "Rinna, did you eat your breakfast?", the AI chat bot 100 may generate two responses, such as "yes, I ate bread," and "How about you? Still felling hungry?". In this scenario the core worker 109 ensures that the first response is provided to the user immediately. Also, the chat bot 100 may ensure that the second response is provided in a time delay, such as 1 or 2 seconds, so that the second message will be provided to the user two seconds after the first message. As such, the cache of the core worker 109 manages these to-be-sent response messages together with candidate identities and appropriate timing for each chat bot generated question or comment.

The annotated text is collected by the answer evaluation system 112 of the chat bot 100. The answer evaluation system 112 analyzes or evaluates the user's answer 106 to determine a relevance score for the answer 106. In some aspects, if the answer 106 was a response to a chat domain question, the answer evaluation system 112 may not collect these answers or collects these answers and sends them to the question selection system 114 without analysis. In other aspects, the answer evaluation system 112 analyzes every answer 106 from the candidate 102.

The answer evaluation system 112 may utilize any known system for evaluating a candidate's answers, which may vary depending upon the technical field. In some aspects, answer evaluation system 112 evaluate the soundness and completeness of the candidate answer based on the answers similarity to a reference answer.

For example, the answer evaluation system 112 may evaluate a computer engineer or programmer utilizing a novel evaluation system for computer engineers or programmers. In this example, if the answer was provided in a technical language, such as computer code, the answer may not have any annotations. In this example, the answer evaluation system 112 analyzes the answer or annotated answer to determine a time and space complexity of the answer. For example, the complexity level may be constant, linear, polynomial, or exponential. For example, O(1) may be utilized to annotate "constant" (time), which means that the algorithm is not related to the input size of the question. The following equation is an example of a constant time algorithm:

int sum=0,n=100; sum=(n+1)*n/2; printf("%d",sum).   EQ #1

In this equation, no matter how large n is, the algorithm will always perform three steps. O(3)=O(1) is utilized to annotate this constant time algorithm. A linear algorithm's time complexity is annotated by O(n). In the linear algorithm example, the time cost increases linearly as n increases. The following is an example of linear time algorithm:

int sum,for(int i=0;i<n;i++){sum+=i;}.   EQ #2

Similarly, an algorithm with a polynomial time complexity is annotated by O($n^a$) where "a" is a constant, such as O($n^2$), O($n^3$) and etc. An algorithm with exponential time complexity is annotated by O($a^n$) where "a" is a constant. Similar annotations, i.e., O(1) to O($a^n$) are also utilized for space (cost of memory size) complexity.

The time and space complexity determines a space cost and a time cost of the answer. The space cost is a ranking based on the amount of computer memory needed to implement the user's answer. The less memory needed to implement the answer, the lower the space ranking and the better the answer is considered. The time cost is a ranking based on how much time will be needed to implement the user's answers. The less time needed to implement the answer, the lower the time ranking and the better the answer is considered. The time cost and the space cost are combined to form the time and space complexity.

In order to determine the time and space complexity of the user's answer, the answer evaluation system 112 determines if the answer was provided in computer code or natural language. If the answer was provided in computer code, the answer evaluation system 112 analyzes the computer code utilizing heuristic rules to determine the time and space complexity. For example, the heuristic rules may count the number of variables and the type of variables used in the code for determining a space cost and the number of loops as well as the heuristic structure of loops to compute time cost.

If the answer was provided in natural language, the answer evaluation system 112 identifies corresponding code for the natural language answer by comparing the answer to the reference answer utilizing a deep semantic similarity model and a recurrent neural network with gated recurrent units. The identified corresponding code is then analyzed utilizing the heuristic rules discussed above to determine the time and space complexity of the answer.

The answer similarity model includes a language model for information retrieval. Given a question q and a candidate response (or, answer) Q, the feature measures the relevance between q and Q through:

$$P(q \mid Q) = \prod_{w \in q} [(1 - \lambda)P_{ml}(w \mid Q) + \lambda P_{ml}(w \mid C)], \quad \text{EQ\#3}$$

where $P_{ml}(w|Q)$ represents the maximum likelihood of term w estimated from Q, and $P_{ml}(w|C)$ is a smoothing item that is calculated as the maximum likelihood estimation in a large-scale corpus C. The smoothing item avoids zero probability, which stems from the terms appearing in the candidate response but not in the question. $\lambda \in (0, 1)$ is a parameter that acts as a trade-off between the likelihood and the smoothing item. This feature performs well when there is a great deal of overlap between a question and a candidate response, but when the two present similar meanings with different words, this feature fails to capture their similarity.

The answer similarity model also includes translation-based language models. These models learn term-term and phrase-phrase translation probability from question-description or question-answer pairs and incorporating the information into maximum likelihood. Given a question q and a candidate response Q, translation-based language is defined as:

$$P_{trb}(q \mid Q) = \prod_{w \in q} [(1 - \lambda)P_{mx}(w \mid Q) + \lambda P_{ml}(w \mid C)], \quad \text{EQ\#4}$$

Where $$P_{mx}(w \mid Q) = \alpha P_{ml}(w \mid Q) + \beta P_{tr}(w \mid Q) \quad \text{EQ\#5}$$

$$P_{tr}(w \mid Q) = \sum_{v \in Q} P_{tp}(w \mid v) P_{ml}(v \mid Q). \quad \text{EQ\#6}$$

Here $\lambda$, $\alpha$, and $\beta$ are parameters satisfying $\alpha + \beta = 1$. $P_{tp}(w|v)$ represents the translation probability from term v in Q to term w in q. The answer similarity model edits distance of character/word level unigrams between question and candidate responses. Further, the answer similarity model determines the maximum subsequence ratio between question and candidate question.

Figure 17A:
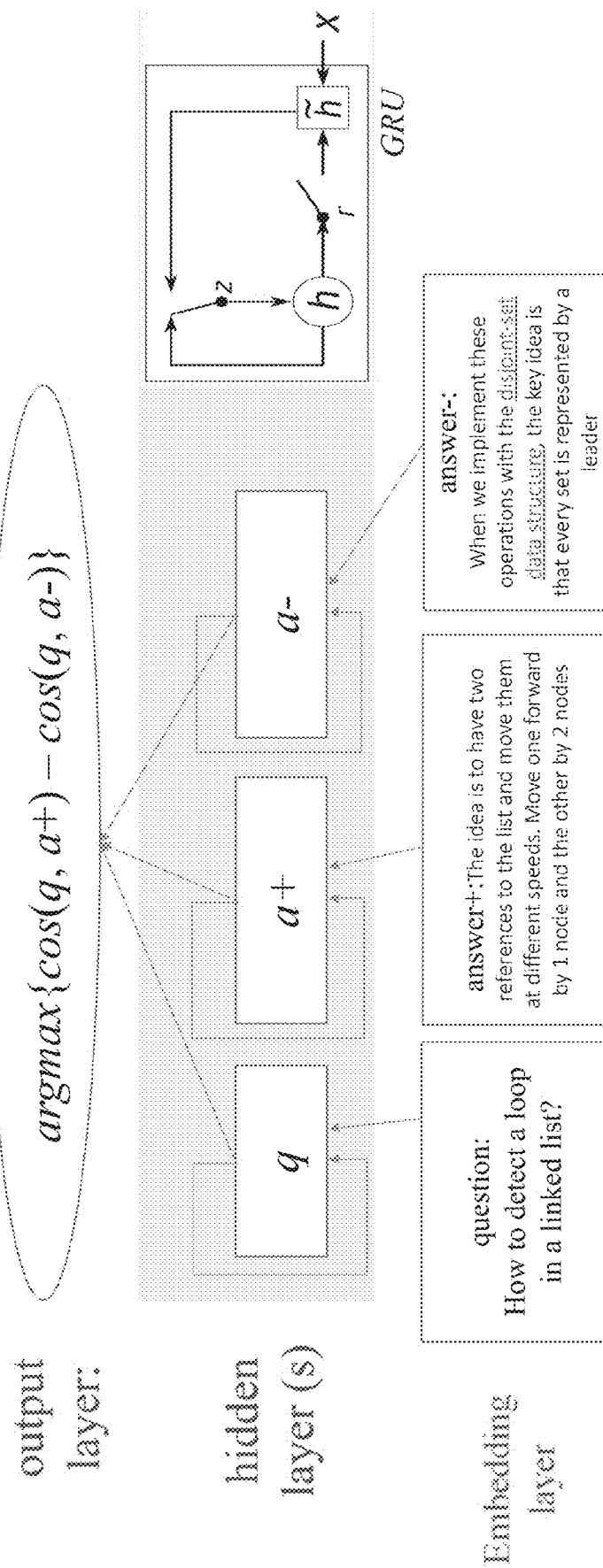
FIG. 17A is a schematic diagram illustrating an example of a recurrent neural network with gated recurrent units to learn the similarity among a question and answers, in accordance with aspects of the disclosure.

A recurrent neural network (RNN) with gated recurrent units (GRUs) to learn the similarity among a question and good/bad answers is illustrated in FIG. 17A. In FIG. 17A, one training sample includes three elements: question; good answer; and bad answer. For example, a question of, "How to detect a loop in a linked list?", a good response of "The idea is to have two references to the list and move them at different speeds. Move one forward by 1 node and the other by 2 nodes," and a bad response of "When we implement these operations with the disjoint-set data structure, the key idea is that every set is represented by a leader" is listed in FIG. 17A. The embedding layer maps these input one-hot expressions into dense vector representations. Then the hidden layer will further make use of GRU to compute the sequence level representations for the question and two answers. The output layer will compute the margin between the similarity of <question, answer+> and <question, answer->. The benefit of this network is that a sparse space of variant sentences can be projected into some dense spaces and then some vector-based computing can be performed to simply compute the "similarity" among questions as well as answers.

Figure 17B:
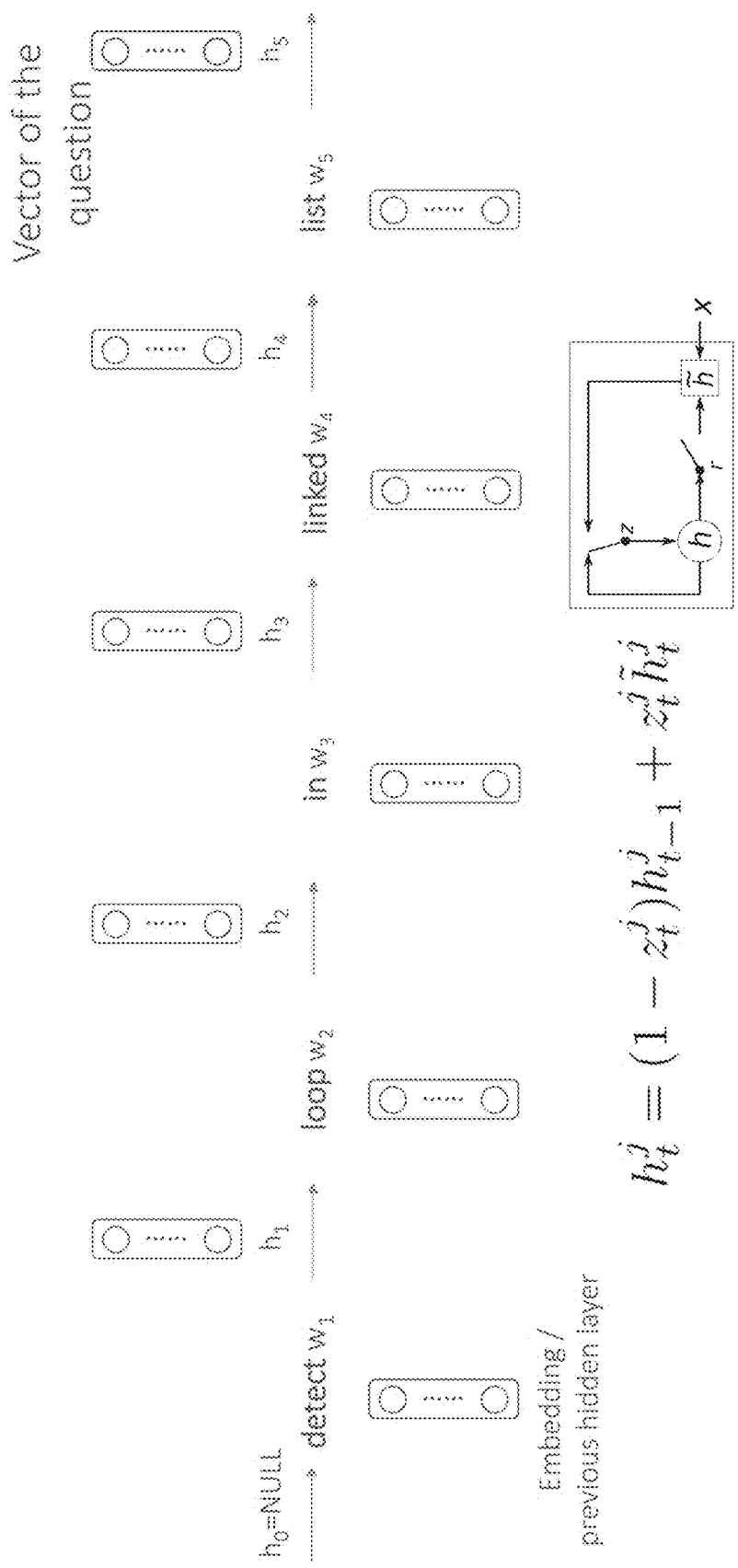
FIG. 17B is a schematic diagram illustrating an example of a left-to-right expedition of the question sequence by the GRU formula of FIG. 17A for the forward process, in accordance with aspects of the disclosure.
Figure 17C:
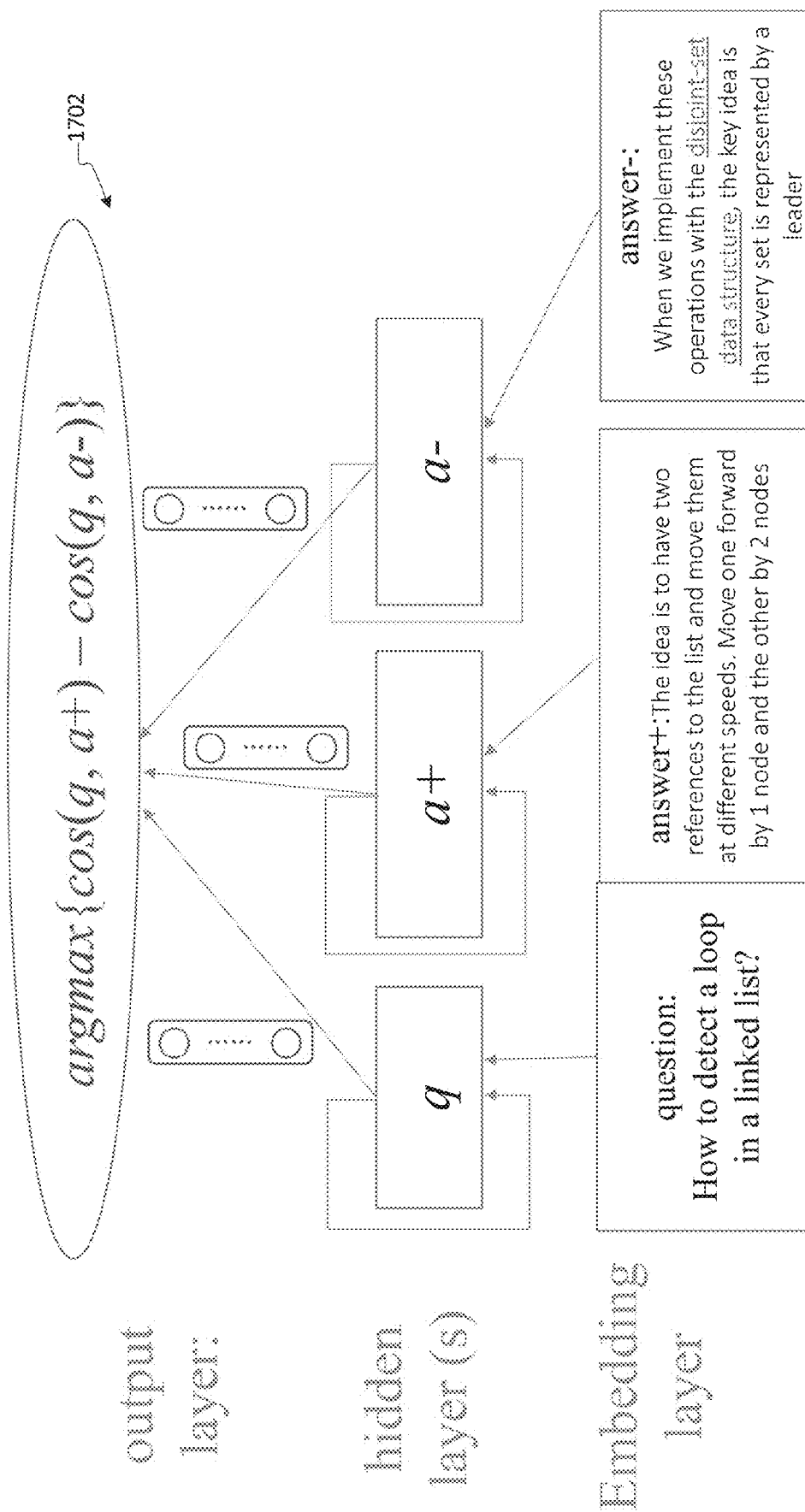
FIG. 17C is a schematic diagram illustrating an example of an output layer, which takes the connection of the two vectors (left-to-right and right-to-left) from FIG. 17B as input and computes the margin, in accordance with aspects of the disclosure.

With large-margin training, the embedding matrices from words to vectors, and the transform matrices from embedding vectors to hidden layer lower-dimension vectors can be obtained. When these matrices are obtained, the testing process can be then performed. Given a question and a corresponding candidate answer, we can go through the network to compute the similarity of the question and the candidate answer to obtain a similarity score. FIG. 17B illustrates a left-to-right expedition of the question sequence by using GRU formula shown in FIG. 17A for the forward process. FIG. 17C illustrates an output layer 1702, which takes the connection of the two vector (left-to-right and right-to-left) as input and compute the margin. The error (if the similarity of <q, a+> is small than the similarity of <q, a->, the distance is taken as error) will be back propagated from output layer and then hidden layer and finally the embedding layer.

Next, the answer evaluation system 112 compares the time and space complexity of the answer to a time and space complexity of the reference answer. The reference answer corresponding to the provided technical question is collected from the collection of technical question-answer pairs 118 in the question-answer index 117. As discussed above, the provided question is also collected from the collection of technical question-answer pairs 118. In some aspects, the answer evaluation system 112 determines a time and space complexity for the reference answer. In other aspects, a time and space complexity for the referenced answer is provided with the reference answer from the collection of technical question-answer pairs 118 in the question-answer index 117.

A relevance score for the answer is determined based on the comparison of the time and space complexity for the answer to the time and space complexity for the reference answer. In some aspects, a learning-to-rank (LTR) system is utilized to rank answers for a question. The answers may be separated into several types. On example of different types is listed below:

Excellent answers—Answers with the best time/space complexities; for example, answers with a relevance score of 3;

Good answers—Answers with relatively good time/space complexities, yet still worse than excellent answer; for example, answers with a score of 2;

Normal correct answers—Answers with correct logic, yet both time/space complexities are worse than good answers; for example, answers with a score of 1; and Negative answers—Answers which are not correct (or, answers for another question which has no relation with current focused question); for example, answers with a score of −1.

The assigning of a relevance score also allows the answer evaluation system 112 to compare the answers from different questions to each other. For example the coding answers of FIGS. 9A and 9B can be compared. FIGS. 9A and 9B illustrate a technical question along with a corresponding reference answer for the technical question written in natural language and in code. In FIG. 9A only two "nodes" are defined, so the space complexity is O(1). Also, the "while" loop traverses the input linked list (headed by "first") only once and thus the time complexity is O(n) where n is the length of the input linked list for FIG. 9A. In FIG. 9B a hashset is defined, and the hashset is used in "for" loop which traverses the input linked list. Thus, the space complexity is O(n) where n is the length of the input linked list for the code answer provided in FIG. 9B. Also, there is only one "for" loop in this code and the loop traverses the input linked list. Thus, the time complexity is similar with space complexity, i.e., O(n) for FIG. 9B. Table 1 below provides the time and space complexities for the codes given in FIG. 9A and FIG. 9B.

TABLE 1

FIG. 9A and FIG. 9B Time and Space Complexity Answer Comparison

|  | Time cost | Space cost |
| --- | --- | --- |
| Answer in FIG. 9A | O(n) | O(1) |
| Answer in FIG. 9B | O(n) | O(n) |

As illustrated in Table 1, the coding answer provided in FIG. 9A is better in terms of space usage than the answer provided in FIG. 9B, while the time costs for each answer are the same.

The sentiment system 122 of the chat bot 100 may also collect the user input from the client computing device 104. The sentiment system 122 analyzes the answer in text provided from the language understanding system 110 to determine an emotional state of the user 102. In some aspects, the sentiment system 122 determines if the emotional state of the user 102 is positive or negative. In other aspects, the sentiment system 122 determines if the emotional state of the user 102 is positive, negative, or neutral. The sentiment system 122 receives the text input from the language understanding system 110 and outputs an emotion label for the text input that is representative of the emotional state of the user 102. The emotion label may be assigned utilizing a simple heuristic rule so that positive emotion for an answer receives a score or emotion label of 2, a neutral answer receives a score or label or 1, and a negative answer receives an emotion label or score of −1. The sentiment system 122 identifies an emotion label by utilizing one or more the following features:

Word ngrams: unigrams and bigrams for words in the text input;

Character ngrams: for each word in the text, character ngrams are extracted, for example, 4-grams and 5-grams may be utilized;

Word skip-grams: for all the trigrams and 4-grams in the text, one of the words is replaced by * to indicate the presence of non-contiguous words;

Brown cluster ngrams: brown clusters are utilized to represent words (in text), and extract unigrams and bigrams as features;

Part-of-speech (POS) tags: the presence or absence of part-of-speech tags are used as binary features;

Lexicons: the English wordnet Sentiment Lexicon may be utilized;

Social network related words: number (in text) of hashtags, emoticons, elongated words, and punctuations are may also be utilized; and Word2vec cluster ngrams: Word2vec tool may be utilized to learn 100-dimensional word embedding from a social network dataset, next a K-means algorithm and L2 distance of word vectors is employed to cluster the million-level vocabulary into 200 classes that represent generalized words in the text.

A multiple class support vector machine (SVM) model is trained utilizing these features to determine the sentiment of user answers. In some aspects, the sentiment system 122 may also utilize sound-based sentiment analysis for any received recorded voice of the applicant to judge how positive the applicant is during a provide response.

The question selection system 114 collects the relevant score for the answer from the answer evaluation system 112 and the emotional state of the user for the answer from the sentiment system 122. The question selection system 114 determines whether to ask the next question in the chat domain or the technical domain based on the relevance score and/or the emotional state of the candidate 102 and then selects a question from the determined domain. The question selection system 114 selects questions so that the chat bot 100 can get an accurate idea of the candidate's technical skill while maintaining a positive interview experience for the candidate 102.

In some aspects, the question selection system 114 may determine if the answer is good or bad based on the relevance score as illustrated by operation 222. In this example, if a relevant score does not meet a predetermined threshold, the answer is considered bad. Next, in this example, the question selection system 114 checks the emotional state of the user 102 as shown by operation 224. In some aspects, if the candidate's emotional state is negative, the question selection system 114 may always select to ask the next questions in the chat domain 232. In alternative aspects, if the candidate's emotional state is negative, the question selection system 114 may only select the chat domain 232 if the answer is also bad. In some aspects, if the candidate's emotional state is positive, the question selection system 114 may always select to ask the next questions in the technical domain 230. In alternative aspects, if the candidate's emotional state is positive, the question selection system 114 may only select the technical domain 230 if the answer was also good. The relevance score and/or emotional state thresholds for determining a question domain may be adjusted as desired by the creator of the chat bot and/or the interviewer.

Once the questions domain has been selected by the question selection system 114, the question selection system 114 selects or collects the appropriate question from the question-answer index 117 as illustrated by operation 234. For example, if the chat domain 232 is selected, the question selection system 114 select a chat question-answer pair from the collection of chat replies 116 based on the emotional state of the user. The selected question is provided to the user and the corresponding answer is sent to the answer evaluation module 112. For example, if the technical domain 230 is selected, the question selection system 114 selects a technical question from the collection of technical question-answer pairs 118. The selected question is sent to the candidate 102 and the corresponding reference answer is send to the answer evaluation system 112.

In some aspects, the question selection system 114 selects the next technical question from the collection of technical question-answer pairs 118 based on a determined level of difficulty. In these aspects, the question selection system 114 determines a level of difficulty for the next question based on the relevance score and/or the candidate's emotion state. For example, if the emotional state is positive and the relevance score is high, the question selection system 114 may increase the level of difficulty for the next question. For example, if the emotional state is negative and the relevance score is high, the question selection system 114 may maintain or decrease the level of difficulty for the next question. In another example, if the emotional state is positive and the relevance score is low, the question selection system 114 may maintain or decrease the level of difficulty for the next question. In a further example, if the emotional state is negative and the relevance score is low, the question selection system 114 may decrease the level of difficulty for the next question. The relevance score and/or emotional state thresholds for determining a level of difficulty for the next question may be adjusted as desired by the creator of the chat bot and/or the interviewer.

In further aspects, the question selection system 114 may select a question from the chat domain if a chat questions has not been provided to the user for a predetermined number of turns. For example, the question selection system 114 may select a question from the chat domain if a chat question has not been provided to the user for the last 2, 3, 4, 5, 10, 15 or any desirable number of turns.

In some aspects, in addition to selecting the next question, the question selection system 114 selects a chat comment to provide with the question. A chat comment is a comment on the candidate's answer regarding the sufficiency of the answer that does not require a response from the candidate 102, such as "great job," and "nice work." While, typically, these chat comments are only provided in response to good answers, comments may be provided for poor answer as well, such as, "so close," or "on the right track." The question selection system 114 selects a chat comment from the collection of chat replies based on the relevance score of the answer and/or the emotional state. For example, the question selection system 114 may select a positive comment in response to good answer and may select an encouraging comment in response to a bad answer from the collection of chat replies. In some aspects, the chat comment is provided after every answer. In other aspects, the chat comment is provided after only good answers to technical questions by the question selection system 114. In other aspects, the chat comment is provided after a predetermined number candidate answers or after a predetermined number positive candidate technical answers by the question selection system 114. As would be understood by a person of skill in the art, the question selection system 114 may be configured to provide a chat comment based on any desired setting.

In some aspects, the question selection system 114 is configured based on the interviewer input. For example, the interview may limit the technical questions to one or more specific categories based on specific computer expertise or other industry expertise based on the hiring needs of the company or interviewer. In these embodiments, the question selection system 114 can only select technical questions from the selected or identified categories. In other aspects, the interviewer may request additional chat questions or additional positive chat comments. In these embodiments, the question selection system 114 will select additional chat questions and/or comments as requested by the interviewer.

Once the next question and/or chat comment has been selected by the question selection system 114, the chat bot 100 sends instructions to the user's client computing device 104 to provide the question and/or chat reply to the user 102. As discussed above, the client device 104 provides the question and/or chat reply in any desired medium, such as in voice or text. The client computing device 104 provides the question and/or chat reply 108B to the candidate.

After the chat bot 100 has finished interviewing a candidate 102, the summary system 120 of the chat bot 100 evaluates and summarizes the candidate's results from the interview. In further aspects, the summary system 120 of the chat bot 100 compares the candidate's summarized results to the summarized results of other candidates. The chat bot 100 provides these results or makes these results available to the interviewer.

While the hiring criterion varies among different companies, there are still several common aspects that may be relevant for each company, such as technical competency, communication skills, team collaboration and/or interpersonal skills. As such, in some aspects, the summary system 120 evaluates the candidate after completion of an interview to determine a communication skills score, an interpersonal skills score, a technical competency score, and/or a team collaboration score for the candidate.

Technical competency can be assessed by analyzing the relevance scores for technical questions asked at different levels of difficulty during the chat bot interview.

Team collaboration can be assessed based on a candidate's answers to prepared teamwork related questions. For example, the chat bot 100 may prepare a basic collection of <question, reference answers> data for teamwork analysis. For instance, the chat bot 100 may ask the following questions: 1) Overall, how effectively did your team work together on this project (in candidate's resume)?; 2) What percentage of your team participated actively and was fully prepared most of the time?; 3) Give one specific example of something you learned from the team that you probably would not have learned working alone; 4) Give one specific example of something the other team members learned from you that they probably would not have learned otherwise; and 5) Suggest at least one change the team could make could be made to improve its performance or the project. Additionally, since different companies have diverse requirement about team collaboration, companies may also be able to supply their own <question, reference good answer> pairs and append this data to "pure chat index", by again using the learning-to-rank framework. The chat bot 100 computes the similarity between the reference good answers and the candidate's answers and determines a relevance score for the provided teamwork questions. The chat bot 100 may utilize this score to evaluate the candidate's team collaboration ability. Sentiment system 122 can be applied again by the chat bot 100 to evaluate how positive the candidate's answer is to evaluate a candidate's teamwork ability. All of these features are analyzed and put into a teamwork score by the summary system 120.

Figure 15:
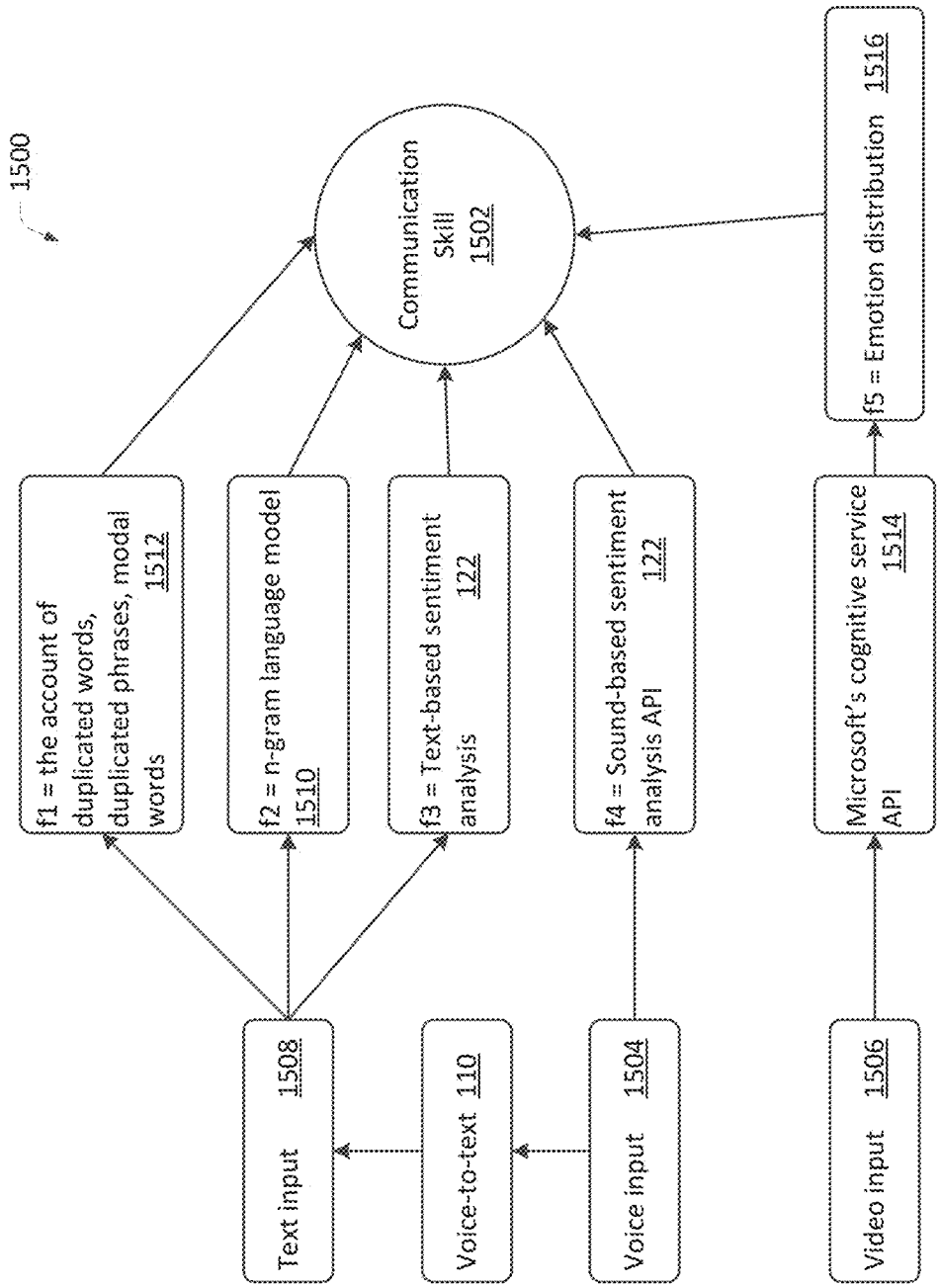
FIG. 15 is a schematic diagram illustrating a flow chart of the process utilized by the communication skills classifier to score the communication skills of a candidate based on the collection of voice inputs, video inputs, and/or text inputs from the candidate by the interview chat bot, in accordance with aspects of the disclosure.

The summary system 120 ranks the candidate's interpersonal skills based on the emotions of the candidate. For example, the summary system 120 includes a cognitive system 1514 for analyzing any signals provided by the user, such as facial expressions, voice changes, and/or language as illustrated in FIG. 15. Based on this analysis, the cognitive system 1514 of the summary system 120 can predict and score emotions of the candidate 102. In some aspects, the cognitive system 1514 predicts emotions of eight dimensions that include happiness, anger, contempt, disgust, fear, sadness, surprise, and neutral. During the interviewing by the chat bot 100, the cognitive system 1514 may evaluate the candidate's emotion every 5 seconds or for any other desired interval of time. In some aspects, the cognitive system 1514 is an online emotional judgement service accessed by the chat bot 100. For example, the cognitive system 1514 may be Microsoft's Cognitive Services application. After the interview is complete, the cognitive system 1514 of the summary system 120 provides scores that indicates how much each analyzed emotion of the candidate 102 was present during the interview.

Figure 14:
FIG. 14 is a screen shot of a user interface illustrating an example of an eight-dimension emotion distribution graph for two different candidates generated by the interview chat bot system, in accordance with aspects of the disclosure.

In some aspects, the summary system 120 provides an emotion distribution graph of the candidate. An analysis of the emotion distribution of the candidate is utilized by the cognitive system 1514 to determine an interpersonal skill score for the candidate. In other aspects, the summary system 120 provides an emotion distribution graph that includes the candidate and one or more other candidates for comparison. The other candidates were previously interviewed by the chat bot 100. For example, FIG. 14 illustrates an example of an eight-dimension emotion distribution graph 1400 for two different candidates. As illustrated by the graph in FIG. 14, the dominant emotion for the first candidate is happiness (30%) and the dominant emotion for the second candidate is sadness (30%). There are several reasons that can cause happiness during an interview, such as a nice answer of some technical questions and received confirmation from the chat bot 100. Also, there are several reasons that can cause sadness, such as failing to provide a complete answer for some normal/challenging questions and receiving some negative signals from the chat bot 100. The emotion distribution graph provided by the summary system automatically captures a candidate's psychological changes. These changes also indicate how emotionally resilient the candidate is when dealing with challenging questions.

The summary system 120 may utilize a communication skill classifier 1500 to score candidate's communication skills 1502. The classifier 1500 uses n-gram language model 1510 and sentiment analysis (via sentiment system 122) of the candidate answers. The classifier 1502 analyzes any received input signals form the candidate, such as text 1508, voice 1504, and even video 1506 to predict a communication skill sore 1502 for a candidate. FIG. 15 illustrates a flow chart of the process utilizes by the classifier 1500 to score the communication skills 1502 of a candidate based on the collection of voice inputs 1504, video inputs 1506, and/or text inputs 1508 from the candidate. Any received voice input 1504 is converted into text 1508 utilizing a language understanding system 110.

The communication skill classifier 1500 may utilize an n-gram language model 1510 trained using reference answers of prepared questions by the classifier. Next, the classifier 1500 may calculate an averaged language model score of the reference answers. In some aspects, the classifier 1500 utilizes a simple heuristic rule to determine when a candidate's answer is good or bad, such as when a candidate answer's language model score is higher than an average answer is considered good and when a candidate answer's language model score is lower than the average the answer is considered bad.

Additionally, the classifier analyzes the text 1508 from the candidate for duplicate words utilizing a duplication system 1512. The duplication system 1512 determines and catalogs duplicated words, duplicated phrases, and modal words as features. For example, a simple heuristic rule for these features is that: when the number of duplicated words/phrases/modal words occurs more than 10% of the answer, then it is a bad answer; otherwise, a good answer;

Further, the classifier 1500 utilizes output from the sentiment system 122. The classifier 1500 may utilize text-based and voice-based sentiment analysis from the sentiment system to determine emotion labels (such as positive, negative, and/or neutral) for the candidate responses.

The classifier 1500 also considers output from the cognitive system 1514 to score the communication skills of the candidate 102. As discussed above, the cognitive system 1514 analyzes facial expressions and other items in the video input 1506 of the candidate to determine one or more emotions, such as happiness, anger, contempt, disgust, fear, sadness, surprise, and neutrality. The distribution of these emotions 1516 is determined by the cognitive system 1514. The distribution of the determined emotions 1516 by the cognitive system 1514 is collected by the classifier 1500 for analysis.

The classifier 1500 analyzes all of the items listed above, such as sentiment analysis, duplicative words analysis, answer evaluation, and the emotion distribution 1516 to determine a communication skill score 1502 for the candidate.

Figure 16:
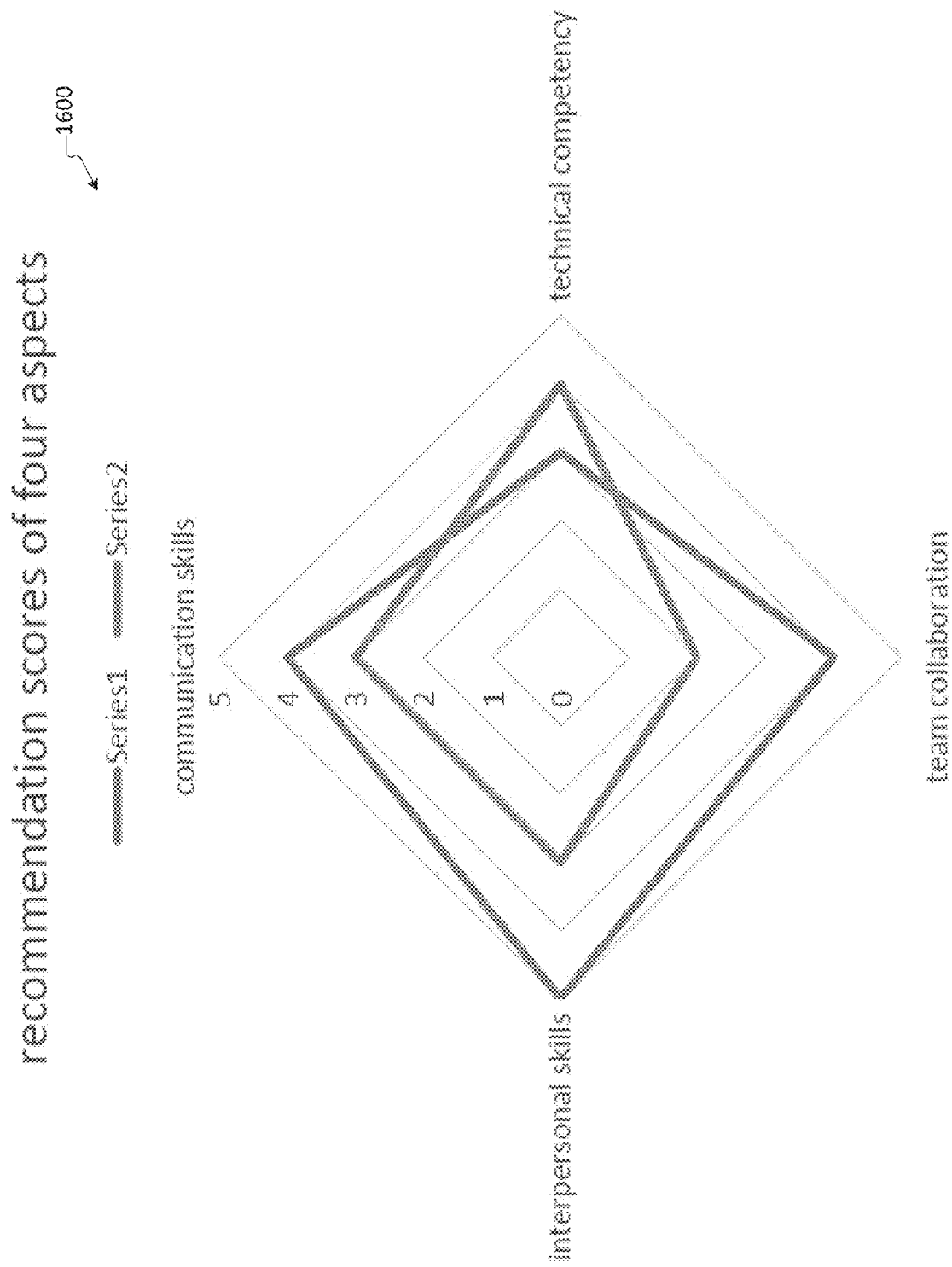
FIG. 16 is a screen shot of a user interface illustrating an example of a comparison summary graph for two different candidates generated by the interview chat bot, in accordance with aspects of the disclosure.

Further, the summary system 120 compiles the candidate's communication skills, interpersonal skills, team collaboration skills, and technical competency sores and provides them or makes them available to the interviewer. In some aspects, the summary system 120 generates a summary graph or chart for the different scores. The summary graph may show the score of each skill for the candidate utilizing one line. In further aspects, the summary system 120 may add one or more other candidates' scores to the summary graph for comparison of different candidates to form a comparison summary graph. For example, FIG. 16 illustrates a comparison summary graph 1600 for two different candidates. In this example, each candidate is listed as one line on the comparison summary as one line in FIG. 16.

The interviewer selects the one or more candidate to display on the comparison summary graph. The interviewer collects the summary graph and/or the comparison summary graph from the chat bot 100. The graphs generated by the summary system 120 provide cogent, easy to understand summaries of one more candidates. These graphs allow the interviewer to quickly determine the strengths and weaknesses of a given candidate and to easily compare the strengths and weakness of one or more different candidates.

In some aspects, the question-answer index collects updates of new question-answer pairs from a question and answer generation system 124. In these embodiments, the chat bot 100 updates previously stored question-answer pairs or adds new question-answer pairs in the question-answer index 117 based on the information received from the question and answer generation system 124. The update information may be received continuously, intermittently, at predetermined time periods, and/or upon the occurrence of a predetermined condition. In some aspects, the question and answer generation system 124 is part of the chat bot 100. In other aspects, the question and answer generation system 124 is separate and distinct from the chat bot 100.

Figure 10:
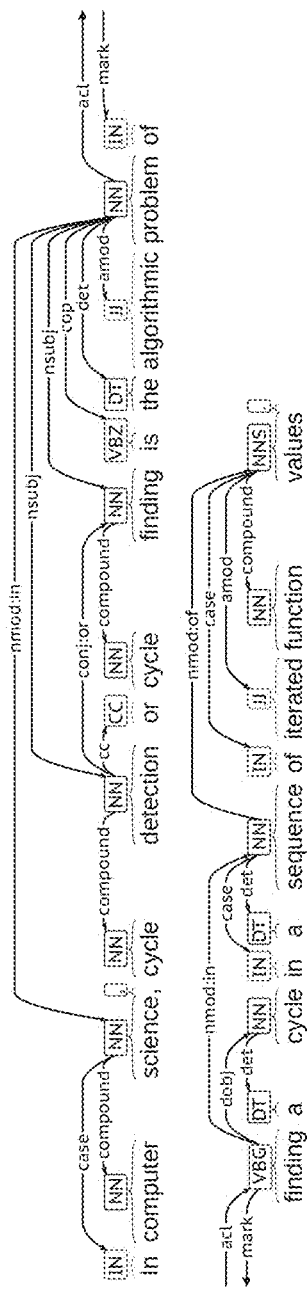
FIG. 10 is a schematic diagram illustrating an example of a syntactic dependency tree generated by a question and answer generation system for the following sentence, "In computer science, cycle detection or cycle finding is the algorithmic problem of finding a cycle in a sequence of iterated function values," in accordance with aspects of the disclosure.

The question and answer generation system 124 prepares a collection of technical question-answer pairs from the world knowledge. The question and answer generation system 124 searches the world knowledge 128 for specific technical knowledge, such computer science. For example, the question and answer generation system 124 may searches textbooks, articles, and/or coding websites for the desired computer science technical knowledge within the world knowledge. Once the technical knowledge 128 has been identified, the question and answer generation system 124 parses sentences from the technical knowledge with a trained sentence parser utilizing a syntactic dependency tree to form parsed sentences. For example, if a textbook that was being parsed contained the following sentence, "In computer science, cycle detection or cycle finding is the algorithmic problem of finding a cycle in a sequence of iterated function values," FIG. 10 provides an example syntactic dependency tree that would be generated by the question and answer generation system 124 for this sentence.

Once the sentence is parsed by the question and answer generation system 124, a knowledge graph is extracted from the parsed sentence utilizing a heuristic algorithm. For example, the following heuristic algorithm and/or rules may be applied to the parsed sentence illustrated in FIG. 10:

Taking all 'compound' words as phrase level entities, and single nouns as word level entities, such as 'computer science', 'cycle detection', 'cycle finding', 'problem', 'cycle', 'sequence', 'function values';

Link entities that share 'and', 'or' relations in the syntactic dependency tree, such as 'cycle detection' and 'cycle finding' have the dependency of 'conj:or' which is a conjunction (phrase) and connected by 'or';

Verbs determine 'is-a' relation between two entities or some types of actions, such as 'is' in this sentence will create a 'is-a' relation between 'cycle detection/cycle finding' and 'algorithmic problem;' also, 'finding' is an action that further explains 'algorithmic problem' and takes 'a cycle' as it's object and 'in a sequence' as it's noun modifier ('nmod:in' tag in the dependency tree);

Adjectives play as some attributes of the entity, such as 'algorithmic' will be taken as a special attribute for entity 'problem', and 'iterated' for 'function values'; and Prepositions determines the scope between entities and/or how noun phrases modify the verbs, such as the 'in' in 'in computer science', this 'in' will clarify the scope that 'problem' is in 'computer science'; for the 'of' that linking 'problem' and the verb 'finding', 'of' takes 'finding' as an action of the 'problem'; For the 'in' that connects 'cycle' and 'sequence', cycle is further a smaller 'entity' that belongs to (exists in) 'sequence'; and for 'of' that connects 'sequence' and 'function values', the sequence is constructed by function values.

Figure 11:
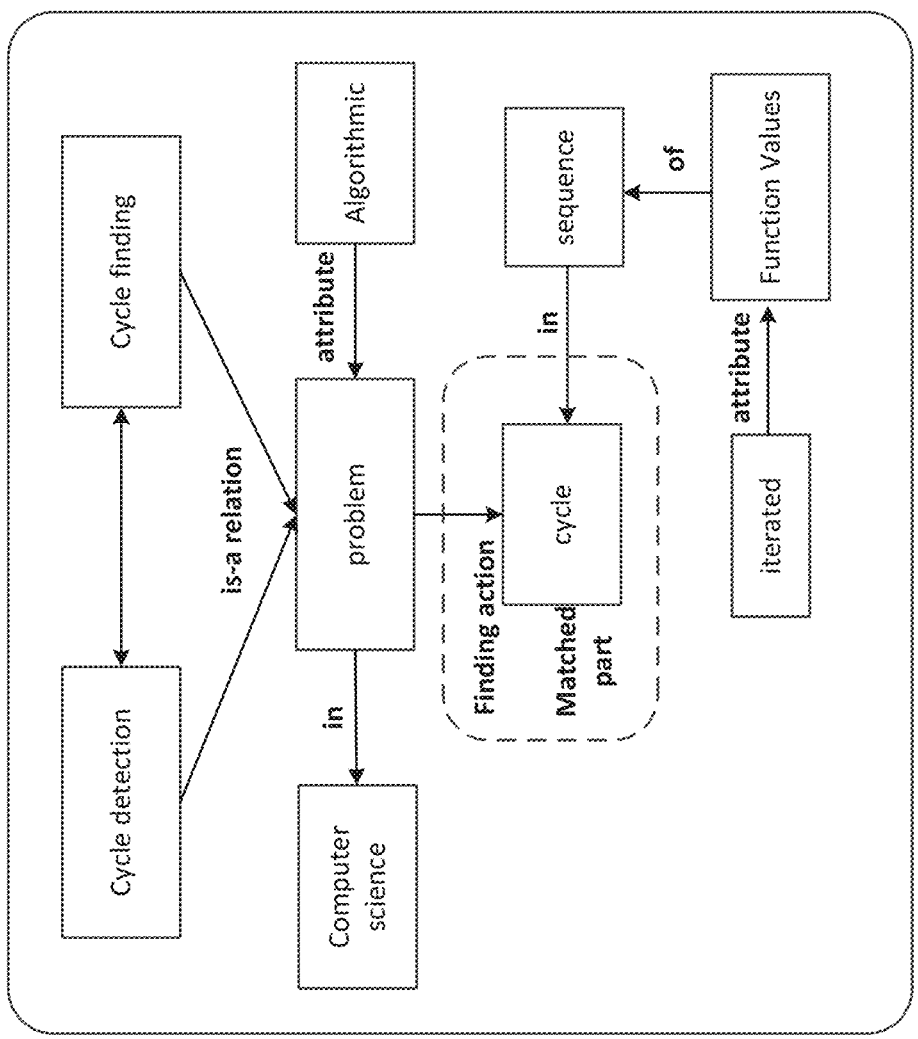
FIG. 11 is a schematic diagram illustrating a knowledge graph extracted from the parsed sentence shown in FIG. 10, in accordance with aspects of the disclosure.

From these entities, the relation among them, and the preposition/adjective/adverb which act as belonging/attribute/action links among a pair/tuple of entities, a knowledge graph, as illustrated in FIG. 11, is extracted from the parsed sentence illustrated in FIG. 10.

Once the knowledge graph has been extracted, the question and answer generation system 124 generates technical question-answer pairs from the knowledge graph. The question and answer generation system 124 generates the technical question-answer pairs by asking the knowledge graph for a definition of a specific entity (that has a direct dependency with the word 'problem', the algorithm of the specific action (whose verb has a direct dependency with the word 'problem') in the knowledge graph. Utilizing this system, the question and answer generation system 124 generates the following technical questions automatically for the parsed sentence illustrated in FIG. 10:

3. "In computer science, what is cycle detection?"; and

4. "How to find a cycle in a sequence of iterated function values?".

Reference answers for the above questions now need to be collected in an automatic way for answering these questions by the question and answer generation system 124. For example, for the determined example questions above, the entity "cycle detection", is taken as the keyword and web pages which return textbook/paper contents are retrieved by the question and answer generation system 124 which contain the following sentences, "Several algorithms for finding cycles quickly and with little memory are known. Floyd's tortoise and the hare algorithm move two pointers at different speeds through the sequence of values until they both point to equal values." FIG. 12 illustrates syntactic dependency trees of two sentences that include answers to the questions derived from FIG. 10 above.

Figure 12:
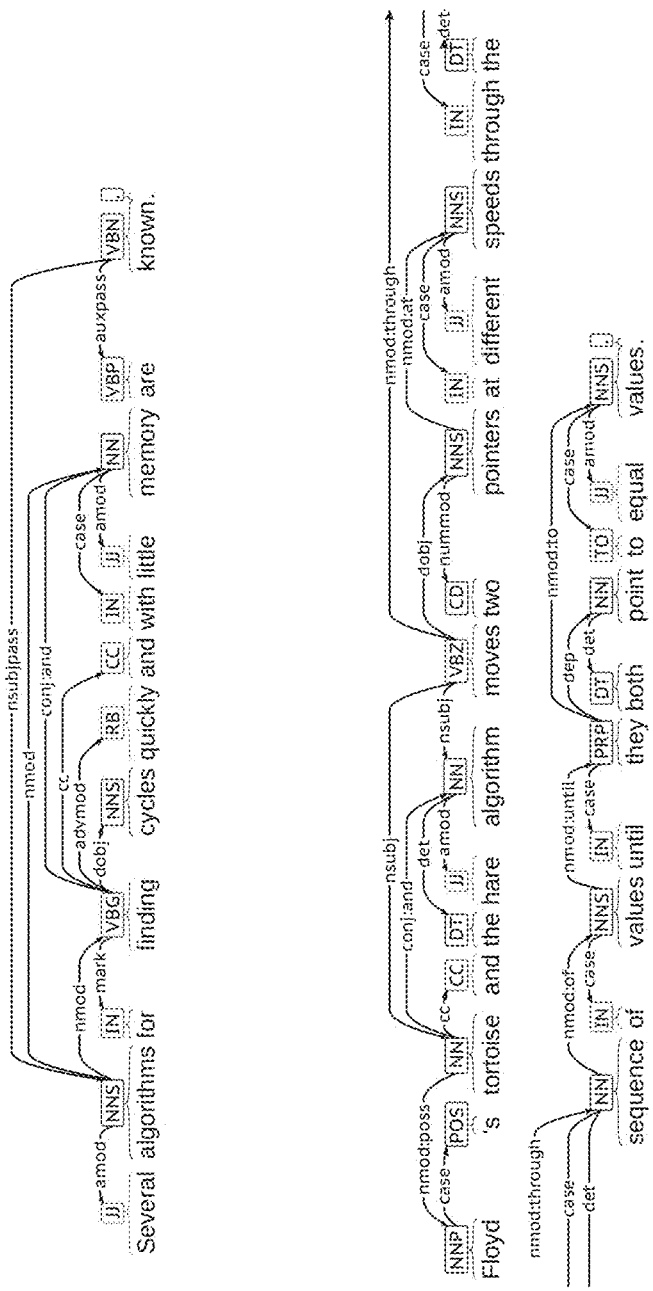
FIG. 12 is a schematic diagram illustrating an example of syntactic dependency trees of two sentences that include answers to the questions derived from FIG. 10 for the following sentence, "In computer science, cycle detection or cycle finding is the algorithmic problem of finding a cycle in a sequence of iterated function values," in accordance with aspects of the disclosure.
Figure 13:
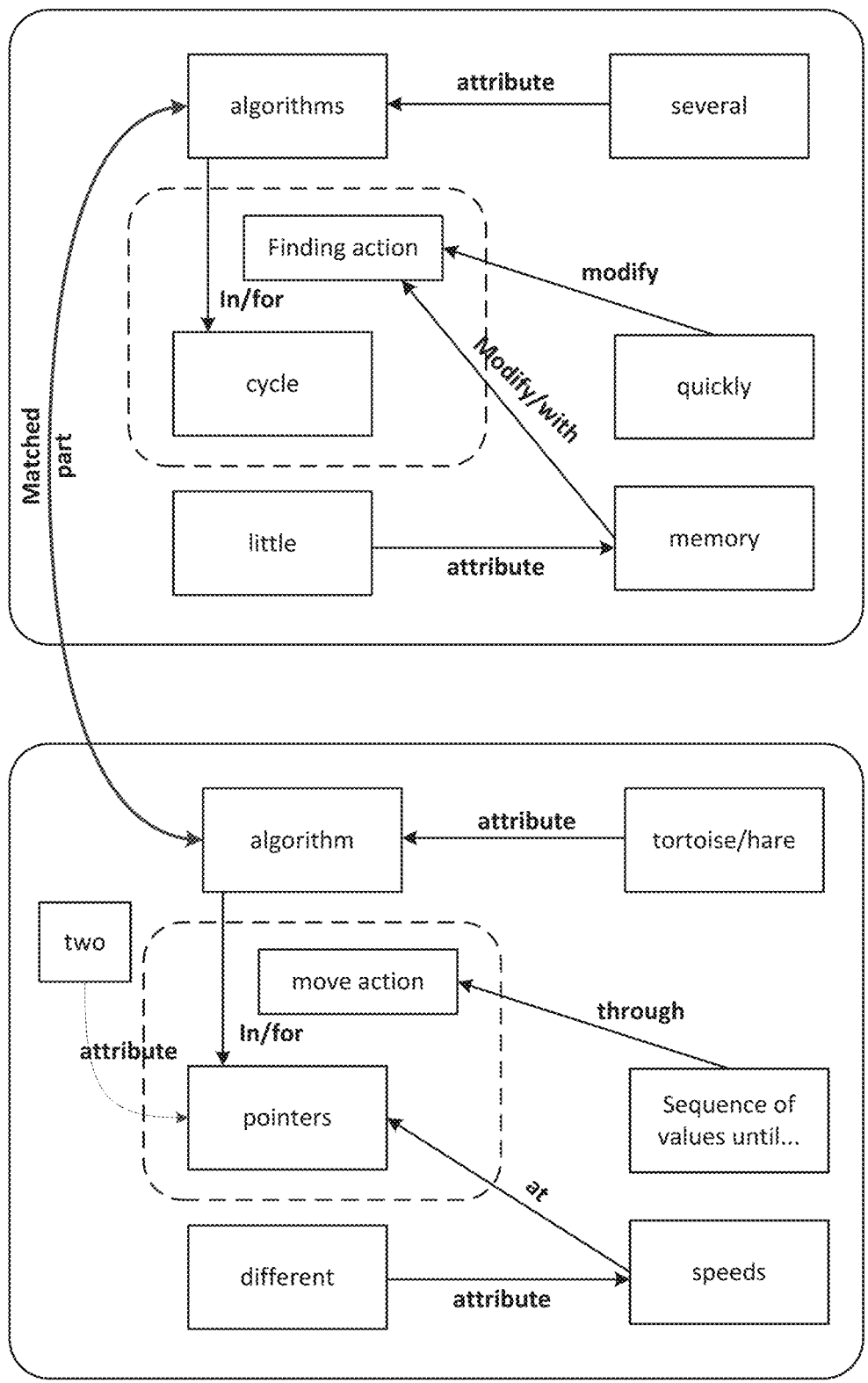
FIG. 13 is a schematic diagram illustrating a knowledge graph extracted from the parsed sentences shown in FIG. 12, in accordance with aspects of the disclosure.

Similar to above for the question generation, the question and answer generation system 124 matches entity "cycles" and action "finding" in FIG. 12 with FIG. 11, and further matches "algorithms" with "algorithm" and the consequent relation between the two sentences in FIG. 12. Next, the question and answer generation system 124 takes "moves two pointers at different speeds through the sequence of values until they both point to equal values" as the answer to the questions derived from the knowledge graph depicted in FIG. 11. Next, the question and answer generation system 124 extracts knowledge graphs as illustrated in FIG. 13 from the parsed answer sentences illustrated in FIG. 12.

Additionally, if the question and answer generation system 124 determines questions and corresponding answers for the technical space of computer science, the answer can be separated into two parts: 1) the text answer (comment) part in natural language sentences; and 2) the code part written in some programming languages (such as Java, c, and so on). These types of questions test the coding ability of software engineer candidates. FIGS. 9A and 9B illustrate examples of question-answer pairs that have a text answer and coding answer from existing coding question-answer websites.

As discussed above, several of the systems and models of the chat bot 100 utilize learning algorithms and/or models for performing accurate analysis. The learning algorithms as utilized herein include deep learning, machine learning, and/or statistical modeling techniques. These models must be trained before use in order to build an effective interview chat bot 100. For example, the RNN, the n-gram language model, the sentence parser, the image-to-text model, multiple support vector machine, the communication skill classifier 1500, etc. are all models that require pre-training. As such, several portions or systems of the chat bot 100 have to be pre-trained and compiled to build an effective interview chat bot 100. However, in some instances, one or more models or systems of the chat bot 100 utilizes heuristic rules until a predetermined amount of training data is available to train that portion of the bot 100.

For example, the classifier 1500 has to be trained. However, before use, there is typically a limited amount of training data available. As such the classifier 1500 utilizes a heuristic method instead to predict candidates' communication skills by some simple formula, such as setting some thresholds for five types of features with higher the scores equating to better communication skill. For example, the heuristic equation below may utilized by the classifier:

$$Score = w1*f1 + w2*f2 + w3*f3 + w4*f4 + w5*f5 \quad \text{EQ \#7}$$

where f1 to f5 take the heuristic rule scores and w1 to w5 can be equal to each other or tuned manually. After collecting a relatively large amount of training data for the classifier 1500, the communication skill classifier 1500 is trained using a simple logistic regression model. The features are similarly f1 to f5.

Figure 4A:
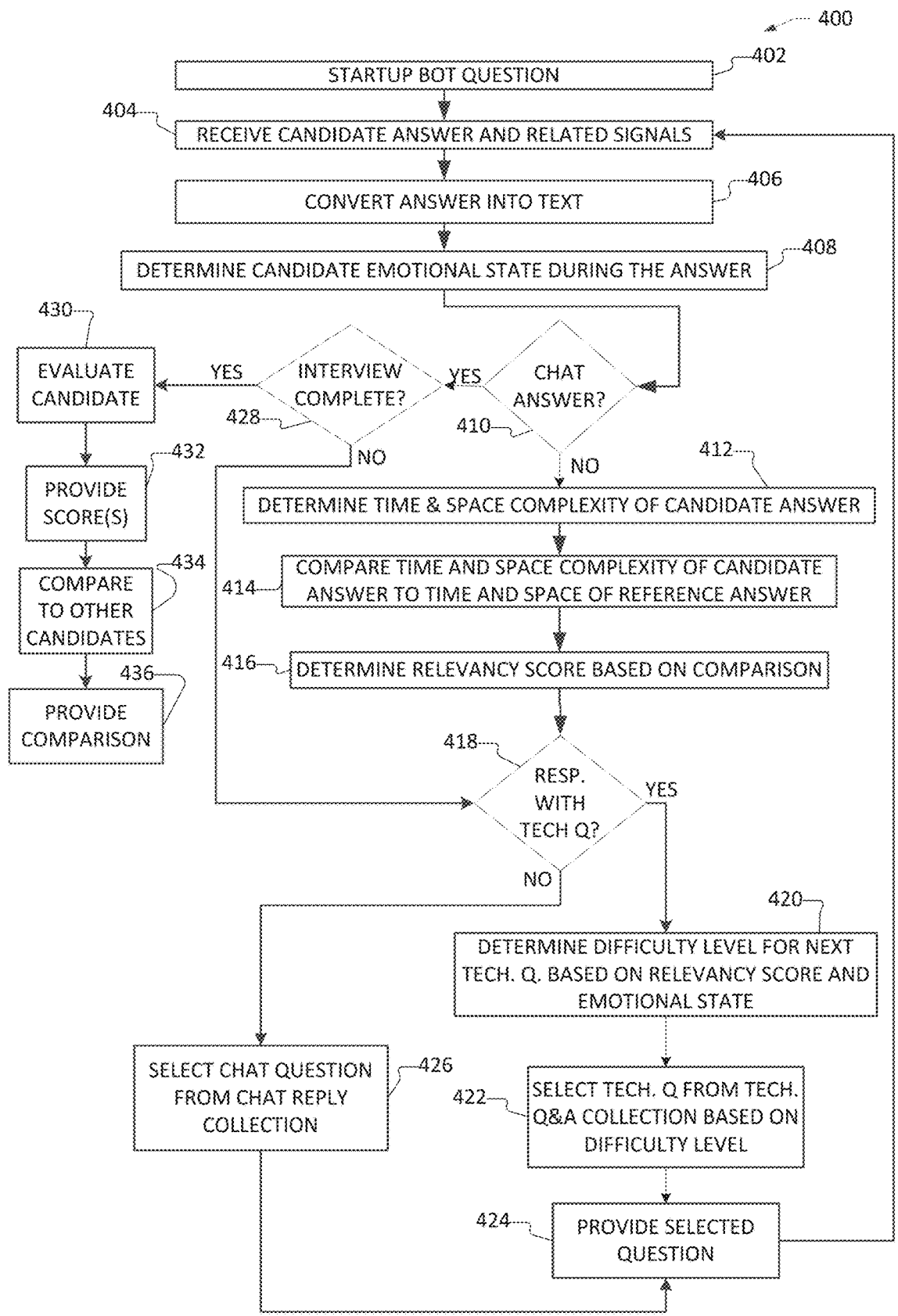
FIGS. 4A-4D are block flow diagram illustrating a method for interviewing candidates utilizing an artificial intelligence interview chat bot system, in accordance with aspects of the disclosure.
Figure 4B:
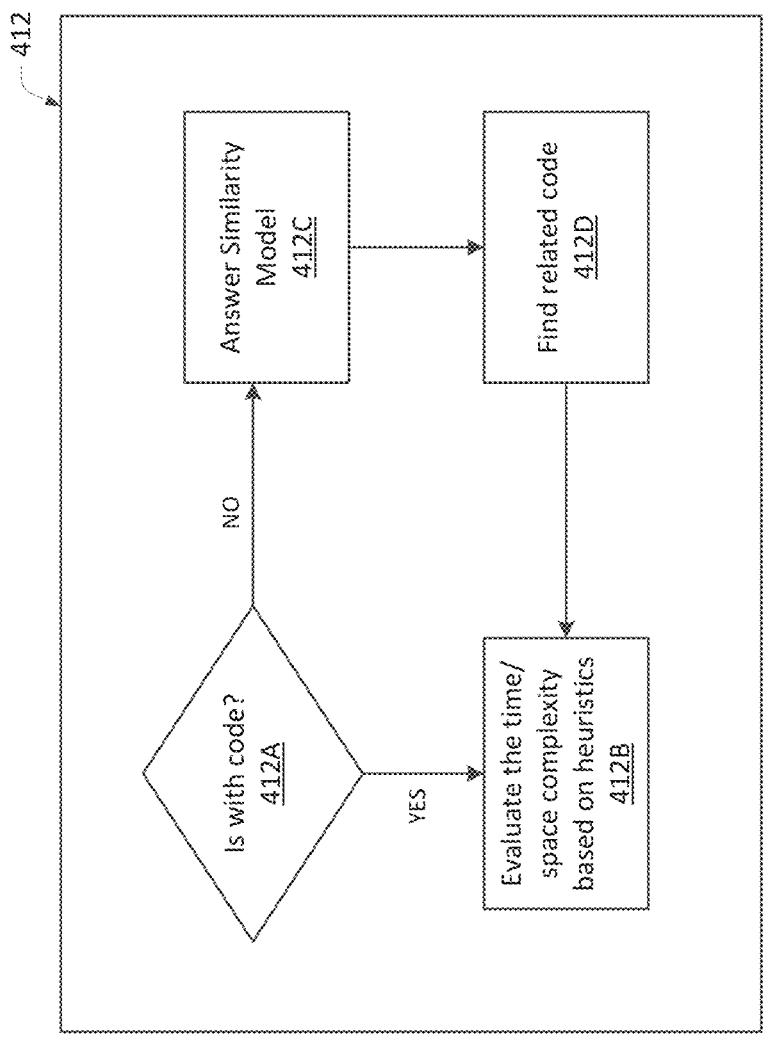
Figure 4C:
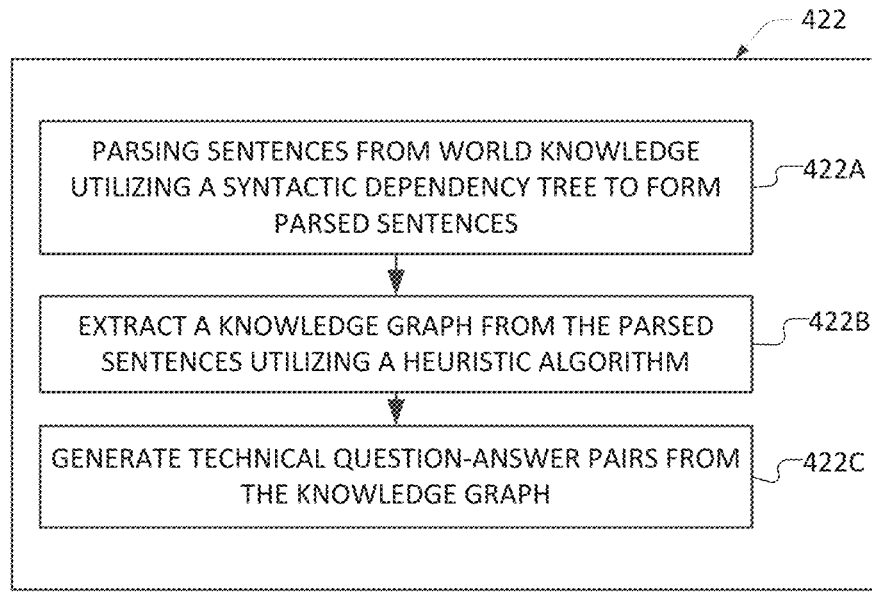
Figure 4D:
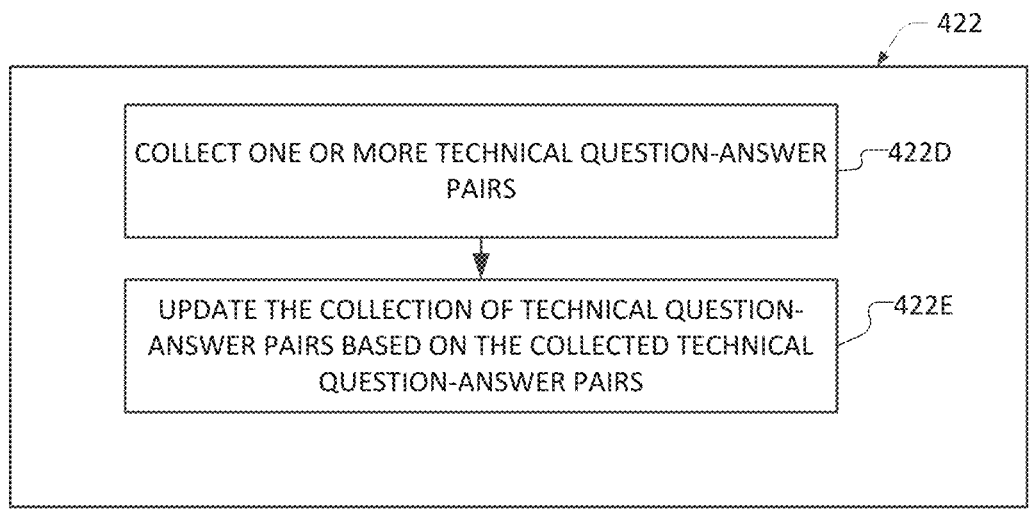

FIGS. 4A and 4D illustrate a flow diagram conceptually illustrating an example of a method 400 for automated interviewing of a technical candidate. In some aspects, method 400 is performed by the chat bot 100 as described above. Method 400 provides automated interviewing of technical candidate that may prepare and/or updating technical question-answer pairs by searching world knowledge. Further, method 400 provides automated interviewing of technical candidate that is also capable of evaluating a received candidate answer to determine a relevance score for the answer and an emotional state of the candidate for the answer. The method may utilize the relevance score and/or the emotional state to determine whether the next reply should be in the chat domain or the technical question domain. Additionally, the method provides automated interviewing of technical candidate that is capable of changing the level of difficulty provided in the next technical question based on a relevance score and/or the emotional state of the candidate for one or more previous answers. Further, method 400 provides an automated interviewing of technical candidate that is able to analyze the interview of the candidate as a whole and provide a summary recommendation of the candidate and/or a comparison of the summary recommendation for the candidate to other candidates that have been previously interviewed.

The ability method 400 to perform an automated interview of a technical candidate as described herein provides an interview chat bot that is capable of providing an inexpensive, effective, enjoyable and unbiased interview and evaluation of technical candidates. Further, the ability of method 400 as described herein to prepare technical question and answer pairs from the world knowledge prevents the interviewer from having to determine a set of technical questions for the interview. Additionally, the ability of the method 400 as described herein to adjust the difficulty level of the technical questions while monitoring for emotional state allows the chat bot to determine the limit of the candidates' technical skill while still providing a positive experience for the candidates during the interview.

Method 400 starts at operation 402. At operation 402 a predetermined startup question is provided to an interview candidate. The predetermined startup question could be in the chat domain, the technical domain, or in both domains.

At operation 404, a candidate answer is collected. The candidate answer may be provided in one or more different inputs, such as video, voice, images, and/or texts. Next, at operation 406 the answer is processed or converted into text. In some aspects, a LU system with one or more different APIs is utilized to convert the received candidate answer into text and/or annotated text.

At operation 408, the candidates answer is evaluated to determine the emotional state of the candidate during an answer. In some aspects, voice data and/or text data from the candidate's answer are evaluated to determine the emotional state of the user during the answer. In further aspects, the emotional state of the candidate is positive or negative. In other aspects, the emotional state of the candidate is positive, negative, or neutral. In some aspects, a candidate's text answer is evaluated utilizing a multiple class support vector machine trained utilizing word ngrams, character ngrams, word skip-grams, brown cluster ngrams, part-of-speech tags, lexicons, social network related words, and/or word2vec cluster ngrams to identify an emotion label for the first answer at operation 408. The emotional state of the user is determined based on the one or more emotion labels for the answer.

At operation 410 the answer of the candidate is evaluated to determine if the answer is in the chat domain and/or the technical domain. If the answer is determined to be in the chat domain at operation 410, operation 428 is performed. If the answer is determined to be in technical domain at operation 410, operation 412 is performed. In some aspects, a core worker is utilized to determine if a candidate answer is in the chat domain or the technical domain. In other aspects, the domain of the candidate answer is assumed based on the domain of the last provided question.

At operation 412, the answer of the candidate is evaluated to determine a time and space complexity of the candidate's answer. FIG. 4B illustrates the steps performed during operation 412 to determine the time and space complexity of the candidate's answer. As illustrated in FIG. 4B, at operation 412A, the candidate answer is analyzed to determine if the answer is in code. If a determination is made that the answer is in code at operation 412A, then operation 412B is performed. If a determination is made that the answer is in natural language or text at operation 412A, then operation 412C is performed. At operation 412B, the code is analyzed utilizing heuristic rules to determine the time and space complexity of the answer. At operation 412C, the text answer is compared to the referenced answer utilizing a deep semantic similarity model and a recurrent neural network with gated recurrent units. At operation 412D, code corresponding to the candidate's text answer is identified based on the result of the comparison performed at operation 412C. Next, the corresponding code from operation 412D is analyzed utilizing heuristic rules to determine the time and space complexity of the answer at operation 412B.

At operation 414 the determined time and space complexity of the candidate answer is compared to a time space complexity of a reference answer. The reference answer is retrieved from the question-answer index 117. The reference answer corresponds to or is paired with the last question provided to the candidate. In some aspects, the reference answer includes a referenced time and space complexity. In other aspects, at operation 412, the reference answer is analyzed to determine a time and space complexity for the reference answer.

At operation 414, a relevance score for the answer is determined based on the comparison of the time and space complexity for the candidate's answer to the time and space complexity for the reference answer. In some aspects, the relevance score may indicate whether the answer provided by the candidate was excellent, good, normal, or negative. In alternative aspects, an answer provided by the candidate is normal, good, and/or excellent if the relevance score meets one or more predetermined thresholds. For example, the relevance score may be a negative score for incorrect answers, a normal score for correct answers with the worst time and space costs, a good score for correct answer with time and space costs that are better than the worst time space costs but that are not the best possible time and space costs, and is an excellent score for correct answer with best time and space costs.

It is understood by a person of skill in the art that operations 408, 410, 412, 414, and/or 416 may be performed at simultaneous, overlapping, or different times. Further, as understood by persons of skill in the art, operations 408, 410, 412 do not have to be performed in the order shown.

At operation 418, a determination of whether to reply to the candidate in the chat domain or the technical domain is made. The reply will include the next question presented to the candidate. In some aspects, the reply also includes a chat comment. The determination made at operation 418 is based on the relevance score and/or the emotional state of the user for one or more previous candidate answers. In some aspects, if the emotional state of the user is negative, a chat domain is always selected for the next question. In other aspects, if the relevance score is above a predetermined threshold, a technical domain is always selected for the next question. In alternative aspects, if the relevance score is normal or better and the emotional state is positive, a technical question is always selected for the next questions at operation 418. The threshold for determining whether to ask the next question in the technical domain or chat domain may be adjustable by the interviewer if more positive interviewing experience or a less positive interviewing experience for the candidate is desired at operation 418. Accordingly, as would be understood by a person of skill in the art, the threshold for selecting the domain for asking the next question may be adjusted as desired by the interviewer or the creator.

In some aspects, the determination of whether to reply to the candidate in the chat domain or the technical domain at operation 418 is further based on how many turns in the conversation has happened without a question in the chat domain. In these aspects, at operation 418, a chat domain is automatically selected if a chat question has not been provided by method 400 for a predetermined number of turns. As would be understood by a person of skill in the art, the predetermine number turns is adjustable as desired by the interviewee and/or the creator of application implementing method 400.

If a determination is made to utilize a chat domain at operation 418, then operation 426 is performed. If a determination is made to utilize a technical domain at operation 418, then operation 420 is performed.

At operation 420, a difficulty level determination for the next technical question is made based on the relevance score and/or the emotional state of the user for one or more previous answers. In some aspects, if the relevance score is good or above, the difficulty level of the next question is always increased at operation 420. In other aspects, if the relevance score is normal or below, the difficulty level for the next question is always decreased. In additional aspects, if the emotional state of the candidate is neutral or negative, the difficulty level of the next question is always decreased at operation 420. In alternative aspects, if the emotional state is positive and the relevance score is negative, the difficulty level of the next questions is decreased or maintained at operation 420. In further aspects, if the emotional state is negative and the relevance score is negative, the difficulty level of the next questions is decreased at operation 420. The thresholds for determining whether to increase, decrease, or maintain a level of difficulty for the next technical question may be adjustable by the interviewer as desired at operation 420. Accordingly, as would be understood by a person of skill in the art, the thresholds increasing, decreasing or maintaining the level of difficulty for the next technical question may be adjusted as desired by the interviewer or the creator of the application running method 400.

At operation 422, a technical question is selected from the collection of question-answer pairs. The collection of question-answer pairs may be stored in a question-answer index 117. The technical question selected from the collection of technical question-answer pairs has a level of difficulty as determined by operation 420. In some aspects, only a portion of the question-answer pairs in the collection of technical questions-answer pairs is available for selection. In these aspects, the interviewer may limit or select one or more technical categories available in the collection of technical questions-answer pairs for the interview. In these aspects, the technical questions are only selected from the chosen or identified categories. Accordingly, the interviewer can customize method 400 to make method 400 more effective at interviewing candidates for any given position opening.

In some aspects, at operation 422, the collection of technical question-answer pairs are prepared or updated from world knowledge. For example, FIG. 4C illustrates operations performed during operation 422 to prepare a collection of technical question-answer pairs from world knowledge. At operation 422A, sentences are parsed from the world knowledge with a trained sentence parser utilizing a syntactic dependency tree to form parsed sentences. The world knowledge may comprise textbooks, articles, and websites in the appropriate technical field. Next, at operation 422B, a knowledge graph is extracted from the parsed sentences utilizing a heuristic algorithm. At operation 422C, technical question-answer pairs from the knowledge graph are generated.

For example, FIG. 4D illustrates operations performed during operation 422 to update a collection of technical question-answer pairs from world knowledge. At operation 422D, one or more technical question-answer pairs are collected. The collected technical question-answer pairs may be collected form a system that automatically generates technical question-answer pairs based on search or world knowledge. Next at operation 422E, the additional technical question-answer pairs are added and/or utilized to update the collection of technical question-answer pairs.

At operation 426, a chat question is selected from the collection of chat replies. The collection of chat replies may be stored on a question-answer index. Additionally, the collection of chat replies may be updated or prepared based on world knowledge at operation 426. In some aspects, the chat question may be selected based on the emotional state and/or the relevance score for one or more previous candidate answers. In other aspects, the chat question is selected by a core worker based on analysis of the received information and a context of the conversation. In further aspects, the chat question includes a chat comment. The chat comment is also received from the collection of chat replies.

The technical question selected from the collection of technical question-answer pairs at operation 422 or the chat question selected form the collection of chat replies is provided to the candidate at operation 424. In some aspects, operation 424 is performed by a core worker to ensure proper response timings for the provided questions and/or associated chat comments at operation 422. Further, at operation 424, the reply or question may be translated into a different output, such as voice, image, video, or etc. before being provided to the candidate. In some aspects, the core worker performs any need output translation at operation 424.

At operation 428, a determination regarding whether or not the interview of the candidate is over or complete is made. If the interview is considered complete and over at operation 428, then operation 430 is performed. If the interview is not complete or over at operation 428, then operation 418 is performed.

At operation 430, the candidate is evaluated based on the overall interview. For example, the candidate may be evaluated based on communication skills, interpersonal skills, technical competency, and team collaboration. A communication skills score, an interpersonal skills score, a technical competency score, and a team collaboration score may be determined for the candidate based on this evaluation of the candidate's communication skills, interpersonal skills, technical competency, and team collaboration at operation 430. In some aspect at operation 430, a graphical representation (also referred to as a candidate summary graphical representation) of the calculated score may be generated. In further aspects, the graphical representation may graph the candidate as one line for each skill in a diamond or square shaped chart or graphic.

In some aspects at operation 430, a graphic is generated with the scores for the emotional dimensions determined in order to calculate the candidate's interpersonal skills score. In these embodiments, the graphical representation may graph the candidate as one line and show each of the candidate's emotions in an octagon or in another geometric shaped chart or graphic.

Next at operation 432 the results of the evaluation, including any generated scores and/or graphics are made available to the interviewer. In some aspects, the evaluation results of the candidate are sent to the interviewer at operation 432. In other aspects, the evaluation results of the candidate are made available for retrieval by the interviewer at operation 432.

In some aspects, method 400 includes operations 434 and operations 436. At operations 436 the evaluation results of the candidate are compared to one or more evaluation results of other candidates. In some aspects, the candidate is compared to every other candidate interviewed for a given position by the interviewer. In other aspects, the candidate is compared one or more other candidates that were previously interviewed by method 400 as selected by the interviewer. In further aspects, a comparison graphical representation is generated that adds the communication skills scores, interpersonal skills scores, technical competency scores, and team collaboration scores for other candidates onto the candidate's summary graphical representation at operation 434. In these aspects, each candidate may be represented by a single line on the comparison graphical representation. Additionally, a graphical representation comparing the determined emotional dimensions of a candidate to other candidates may also be generated at operation 434. In these aspects, each candidate may be represented by a single line on the emotion comparison graphical representation.

Next at operation 436 the results of the comparisons, including any generated scores and/or graphics, are made available to the interviewer. In some aspects, the comparison results of the candidates are sent to the interviewer at operation 436. In other aspects, the comparison results of the candidates are made available for retrieval by the interviewer at operation 436.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
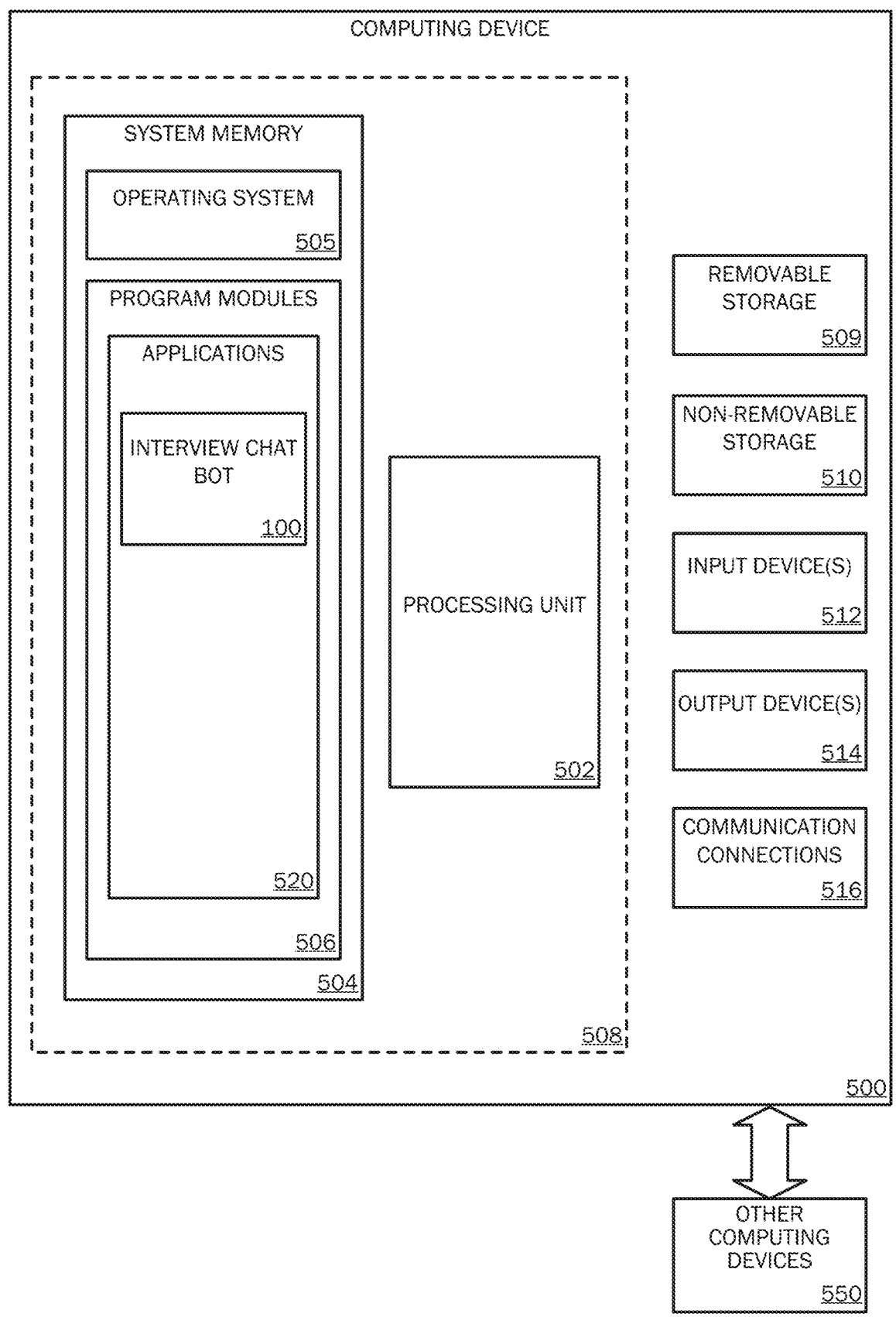
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the AI interview chat bot 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the chat bot 100 that can be executed to employ method 400. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., LU system 110, answer evaluation system 112, question selection system 114, summary system 120, sentiment system 122, and/or the question and answer generation system 124) may perform processes including, but not limited to, performing method 400 as described herein. For example, the processing unit 502 may implement the chat bot 100, including the LU system 110, answer evaluation system 112, question selection system 114, summary system 120, sentiment system 122, and/or the question and answer generation system 124. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the chat bot 100 allows a user to perform an online search in one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
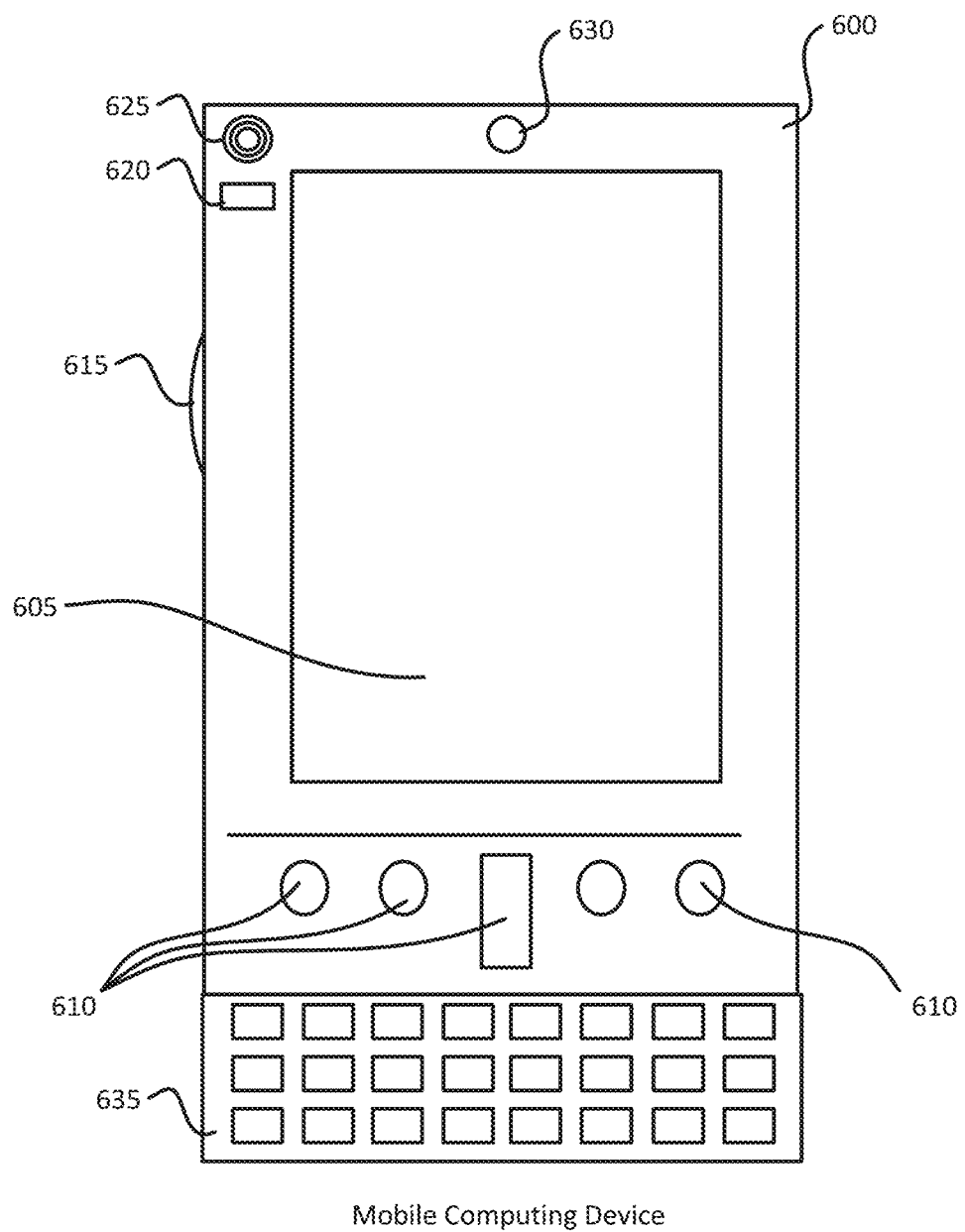
FIG. 6A is a simplified block diagram of a mobile computing device with which various aspects of the disclosure may be practiced.
Figure 6B:
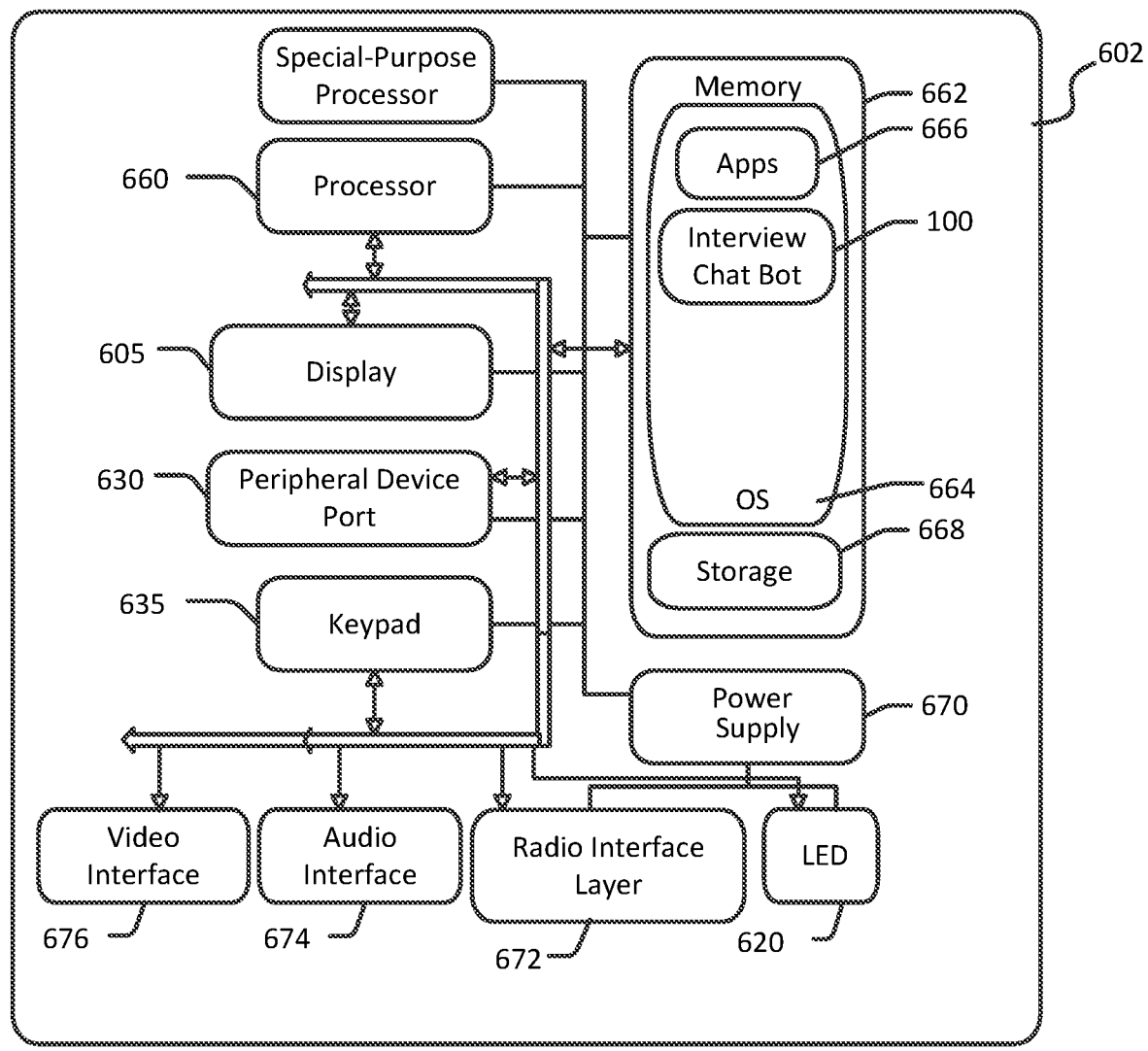
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the chat bot 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
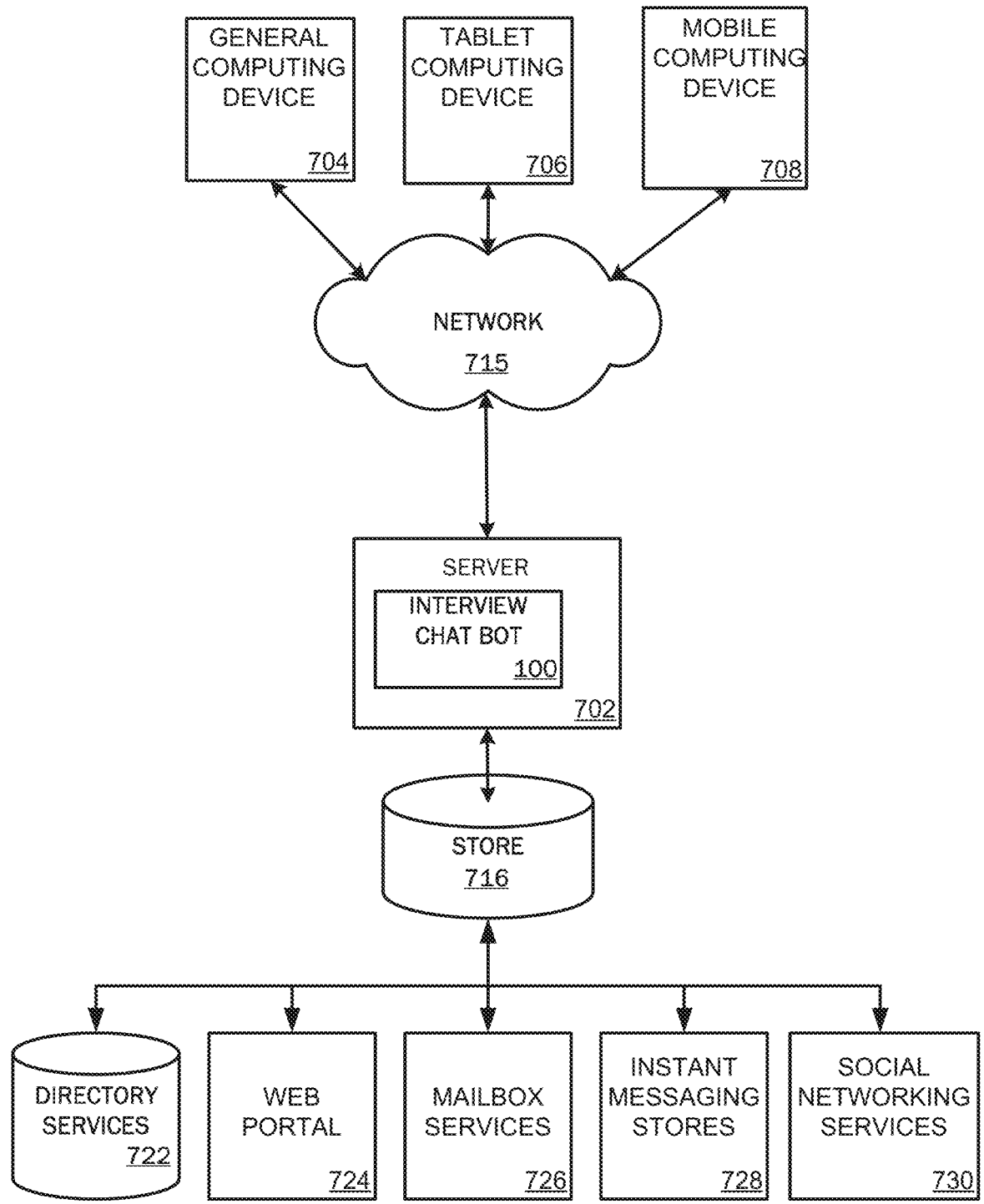
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types (e.g., store 716). For example, various documents may be stored using a directory service 722, a web portal 724, a mailbox service 726, an instant messaging store 728, and/or a social networking site 730. By way of example, the chat bot may be implemented in a general computing device 704, a tablet computing device 706 and/or a mobile computing device 708 (e.g., a smart phone). In some aspects, the server 702 is configured to implement a chat bot 100, via the network 715 as illustrated in FIG. 7.

Figure 8:
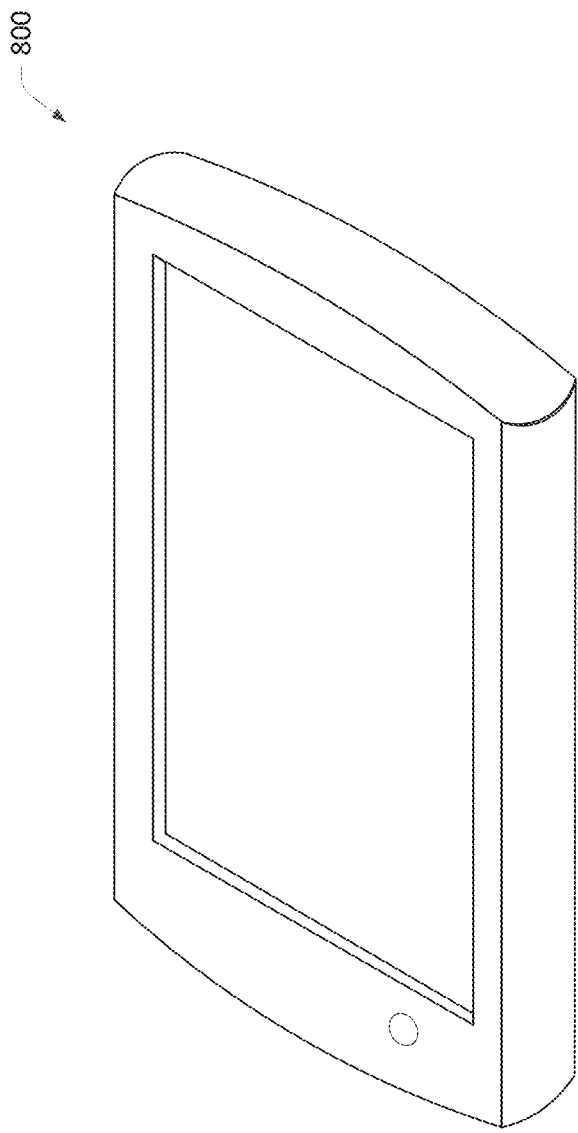
FIG. 8 illustrates a tablet computing device with which various aspects of the disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for automated interviewing of software engineers, the system comprising:
   at least one processor; and
   a memory for storing and encoding computer executable instructions that, when executed by the at least one processor is operative to:
      receive a first answer to a first question given to a candidate, wherein the first question is a first technical question;
      analyze the first answer to determine a time and space complexity of the first answer, the analyzing comprising:
         determining that the first answer is not in code;
         identifying related code to the first answer by comparing the first answer to a reference answer for the first question in a collection of technical question-reference answer pairs utilizing at least a deep semantic similarity model; and
         analyzing the related code utilizing one or more heuristic rules to determine the time and space complexity of the first answer;
      compare the time and space complexity of the first answer to a time and space complexity of a reference answer for the first question;
      determine a relevance score of the first answer based on the comparison of the time and space complexity of the first answer to the time and space complexity of the reference answer;
      analyze at least one of a voice input or a text input of the first answer to determine an emotional state of the candidate;
      determine whether a first reply to the candidate should be in a chat domain or in a technical domain based on the relevance score and the emotional state to form a domain determination;
      select the first reply from a collection of chat replies or from the collection of technical question-reference answer pairs based on the domain determination; and
      provide the first reply to the candidate in response to the first answer,
         wherein the next technical question provided to the candidate is selected from the collection of technical question-reference answer pairs, the next technical question having a difficulty level that is based at least on the relevance score, and
         wherein a next chat reply provided to the candidate is selected from the collection of chat replies.

2. The system of claim 1, wherein analyzing the first answer to determine the time and space complexity of the first answer further comprises based on a determination that the first answer is in code, analyzing the code utilizing one or more heuristic rules to determine the time and space complexity of the first answer.

3. The system of claim 1, wherein identifying the related code to the first answer by comparing the first answer to the reference answer for the first question in the collection of technical question-reference answer pairs utilizing at least the deep semantic similarity model comprises identifying the related code to the first answer by comparing the first answer to the reference answer for the first question in the collection of technical question-reference answer pairs utilizing the deep semantic similarity model and a recurrent neural network with gated recurrent units.

4. The system of claim 1, wherein analyzing the at least one of the voice input or the text input of the first answer to determine the emotional state of the candidate during the first answer comprises:
utilizing a multiple class support vector machine trained utilizing at least one of word ngrams, character ngrams, word skip-grams, brown cluster ngrams, part-of-speech tags, lexicons, social network related words, and word2vec cluster ngrams to identify an emotion label for the emotional state, the emotion label being one of a plurality of emotion labels that include a first emotion label representing a positive emotional state and a second emotion label representing a negative emotional state;
determining that the emotional state is negative based on the emotion label.

5. The system of claim 4, wherein the domain determination is the chat domain, and wherein the first reply is selected from the collection of chat replies.

6. The system of claim 1, wherein analyzing the at least one of the voice input or the text input of the first answer to determine the emotional state of the candidate during the first answer comprises:
utilizing a multiple class support vector machine trained utilizing multiple features to identify an emotion label for the first answer, the emotion label being one of a plurality of emotion labels that include a first emotion label representing a positive emotional state and a second emotion label representing a negative emotional state; and
determining that the emotional state is positive based on the emotion label.

7. The system of claim 6, wherein determining whether the first reply to the candidate should be in the chat domain or the technical domain is further based on previously provided chat replies to form the domain determination, and
wherein the domain determination is the chat domain because a chat reply has not been provided for at least two turns of a conversation between the candidate and the system.

8. The system of claim 6, wherein determining whether the first reply to the candidate should be in the chat domain or the technical domain is further based on previously provided chat replies to form the domain determination, and
wherein the domain determination is the technical domain because a chat reply was provided in one of previous two turns of a conversation between the candidate and the system.

9. The system of claim 1, wherein the relevance score is a negative score for incorrect answers, is a normal score for correct answers with worst time and space costs, is an excellent score for the correct answers with best time and space costs, and is a good score for the correct answers with time and space costs that are better than the worst time and space costs but that are not the best time and space costs.

10. The system of claim 9, wherein the relevance score is the excellent score,
wherein the emotion label is positive, and
wherein the difficulty level for the next technical question is increased.

11. The system of claim 9, wherein the relevance score is the normal score,
wherein the emotion label is positive, and
wherein the difficulty level for the next technical question is not increased.

12. The system of claim 9, wherein the relevance score is the negative score,
wherein the emotion label is negative, and
wherein the difficulty level for the next technical question is decreased.

13. The system of claim 1, wherein the at least one processor is further operative to:
evaluate the candidate after completion of an interview to determine a communication skills score, a interpersonal skills score, a technical competency score, and a team collaboration score for the candidate; and
provide the communication skills score, the interpersonal skills score, the technical competency score, and the team collaboration score to an interviewer in a candidate summary graphical representation.

14. The system of claim 13, wherein the at least one processor is further operative to:
add communication skills scores, interpersonal skills scores, technical competency scores, and team collaboration scores for other candidates on the candidate summary graphical representation to form a comparison graphical representation; and
provide the comparison graphical representation to the interviewer.

15. The system of claim 14, wherein each candidate is represented by a single line on the comparison graphical representation.

16. The system of claim 1, wherein the at least one processor is further operative to update the collection of technical question-answer pairs or to prepare the collection of technical question-answer pairs,
wherein update the collection of technical question-reference answer pairs comprises:
collect additional technical question-reference answer pairs for the collection of technical question-reference answer pairs; and
add the additional technical question-reference answer pairs to the collection of technical question-reference answer pairs, and
wherein prepare the collection of technical question-answer pairs comprises:
parsing sentences from world knowledge with a trained sentence parser utilizing a syntactic dependency tree to form parsed sentences,
wherein the world knowledge comprises textbooks, articles, and coding websites;
extracting a knowledge graph from the parsed sentences utilizing a heuristic algorithm; and
generating technical question-reference answer pairs from the knowledge graph.

17. A method for interviewing software engineers utilizing a chat bot, the method comprising:
receiving a first answer to a first technical question given to a candidate;
analyzing the first answer to determine a time and space complexity of the first answer, the analyzing comprising:
determining that the first answer is not in code;
identifying related code to the first answer by comparing the first answer to a reference answer for the first question in a collection of technical question-reference answer pairs utilizing a deep semantic similarity model; and
analyzing the related code utilizing one or more heuristic rules to determine the time and space complexity of the first answer;

comparing the time and space complexity of the first answer to a time and space complexity of the reference answer for the first technical question;

determining a normal relevance score of the first answer based on the comparison of the time and space complexity of the first answer to the time and space complexity of the reference answer;

analyzing at least one of a voice input or a text input for the first answer by the candidate to determine that the candidate is in a negative emotional state;

determining that a difficulty level for a second technical question should be less than a difficulty level for the first technical question based on the normal relevance score and the negative emotional state;

determining that a first reply to the candidate should be in a chat domain based on the negative emotional state of the candidate;

in response to determining that the first reply should be in the chat domain, selecting the first reply from a collection of chat replies;

providing the first reply to the candidate in response to the first answer;

receiving a second answer from the candidate in response to the first reply;

analyzing at least one of a voice input or a text input for the second answer to determine that the candidate is in a positive emotional state;

determining that a second reply to the candidate should be in a technical domain based on the positive emotional state of the candidate;

in response to determining that the second reply should be in the technical domain, selecting the second technical question from the collection of technical question-answer pairs, the second technical question having the difficulty level that is less than the difficulty level of the first technical question; and providing the second technical question to the candidate in response to the second answer.

18. The method of claim 17, further comprising:

evaluating the candidate after completion of an interview based on communication skills, interpersonal skills, technical competency, and team collaboration;

determining a communication skills score, an interpersonal skills score, a technical competency score, and a team collaboration score for the candidate based on the evaluating of the candidate;

generating a candidate summary graphical representation that shown the communication skills score, the interpersonal skills score, the technical competency score, and the team collaboration score of the candidate; and providing the candidate summary graphical representation to an interviewer.

19. The method of claim 18, further comprising:

generating a comparison graphical representation that add communication skills scores, interpersonal skills scores, technical competency scores, and team collaboration scores for other candidates on the candidate summary graphical representation;

providing the comparison graphical representation to the interviewer, wherein each candidate is represented by a single line on the comparison graphical representation.

20. A system, the system comprising:

a computing device including a processing unit and a memory, the processing unit building a chat bot for interviewing software engineers, the computing device is operable to:

prepare a collection of chat replies from world knowledge and from received predetermined chat question-answer pairs;

prepare a collection of technical question-answer pairs from the world knowledge, wherein the world knowledge includes textbooks, articles, and coding websites, wherein prepare the collection of technical question-answer pairs from the world knowledge comprises:

parsing sentences from the world knowledge with a trained sentence parser utilizing a syntactic dependency tree to form parsed sentences, extracting a knowledge graph from the parsed sentences utilizing a heuristic algorithm, and generating technical question-answer pairs from the knowledge graph;

select questions from the collection of technical question-answer pairs and the collection of chat replies based on relevance scores of candidate provided answers and emotional states of candidates during the candidate provided answers;

assign the relevance scores to user provided answers, utilizing a recurrent neural network that determines time and space complexities of the candidate provided answers and compares the time and space complexities of the candidate provided answers with time and space complexities of corresponding reference answers;

determine emotional states for each candidate provided answers by evaluating text input from the candidate provided answers; and evaluate communication skills, interpersonal skills, technical competency, and team collaboration of every candidate to determine a recommendation score for each of the communication skills, the interpersonal skills, the technical competency, and the team collaboration for the candidates.

* * * * *